(12) United States Patent
Saitoh et al.

(10) Patent No.: US 9,141,175 B2
(45) Date of Patent: Sep. 22, 2015

(54) DISPLAY DEVICE, ELECTRONIC APPARATUS, METHOD FOR CONTROLLING DISPLAY DEVICE, AND METHOD FOR CONTROLLING ELECTRONIC APPARATUS

(75) Inventors: Kohji Saitoh, Osaka (JP); Akizumi Fujioka, Osaka (JP); Masami Ozaki, Osaka (JP); Toshihiro Yanagi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/009,862

(22) PCT Filed: Apr. 4, 2012

(86) PCT No.: PCT/JP2012/059192
§ 371 (c)(1),
(2), (4) Date: Oct. 4, 2013

(87) PCT Pub. No.: WO2012/137816
PCT Pub. Date: Oct. 11, 2012

(65) Prior Publication Data
US 2014/0015787 A1    Jan. 16, 2014

(30) Foreign Application Priority Data
Apr. 8, 2011  (JP) .................................. 2011-086814

(51) Int. Cl.
*G06F 3/0488*    (2013.01)
*G06F 1/32*    (2006.01)
(Continued)

(52) U.S. Cl.
CPC .............. *G06F 1/3262* (2013.01); *G06F 3/044* (2013.01); *G06F 3/0412* (2013.01); *G06F 3/0416* (2013.01); *G09G 3/3648* (2013.01); *G09G 3/3614* (2013.01); *G09G 3/3688* (2013.01);
(Continued)

(58) Field of Classification Search
CPC ... G06F 3/041; G06F 3/0416; G06F 3/04883; G06F 3/0488; G06F 3/016; G06F 3/0412; G06F 3/044; G06F 2203/04104
USPC ...................... 345/173–179; 178/18.01–18.09
See application file for complete search history.

(56) References Cited

U.S. PATENT DOCUMENTS

2002/0036636 A1 *   3/2002   Yanagi et al. .................. 345/211
2002/0093473 A1 *   7/2002   Tanaka et al. .................... 345/87
(Continued)

FOREIGN PATENT DOCUMENTS

JP    2001-312253 A    11/2001
JP    2002-123234 A    4/2002
(Continued)

OTHER PUBLICATIONS

Official Communication issued in International Patent Application No. PCT/JP2012/059192, mailed on Jul. 3, 2012.

*Primary Examiner* — Olga Merkoulova
(74) *Attorney, Agent, or Firm* — Keating & Bennett, LLP

(57) ABSTRACT

When a detection device (20) detects a TP operation (touch panel operation) with respect to an electronic apparatus (100), a display device (1) advances (accelerates) timing of a scanning period which is after and nearest to detection of the TP operation so that the timing of the scanning period comes earlier than conventional timing (a) which is predetermined for a case where the TP operation is not detected in the non-scanning period, that is, the timing of the scanning period is set to timing (b).

15 Claims, 16 Drawing Sheets

(51) Int. Cl.
  *G06F 3/041* (2006.01)
  *G06F 3/044* (2006.01)
  *G09G 3/36* (2006.01)

(52) U.S. Cl.
  CPC .. *G09G 2310/0291* (2013.01); *G09G 2330/021* (2013.01); *G09G 2340/0435* (2013.01); *G09G 2354/00* (2013.01)

(56) References Cited

U.S. PATENT DOCUMENTS

2002/0180673 A1 12/2002 Tsuda et al.
2009/0102809 A1 4/2009 Mamba et al.
2009/0207154 A1 8/2009 Chino
2010/0065845 A1* 3/2010 Nakayama ............... 257/43
2010/0084649 A1 4/2010 Seo et al.
2011/0205254 A1* 8/2011 Umezaki et al. ............. 345/690
2012/0019454 A1* 1/2012 Huang ...................... 345/173

FOREIGN PATENT DOCUMENTS

| JP | 2004-102054 A | 4/2004 |
| JP | 2005-140959 A | 6/2005 |
| JP | 2009-104268 A | 5/2009 |
| JP | 2009-193482 A | 8/2009 |
| JP | 2009-294903 A | 12/2009 |
| JP | 2010-108303 A | 5/2010 |
| KR | 10-2010-0039738 A | 4/2010 |

* cited by examiner

F I G. 1
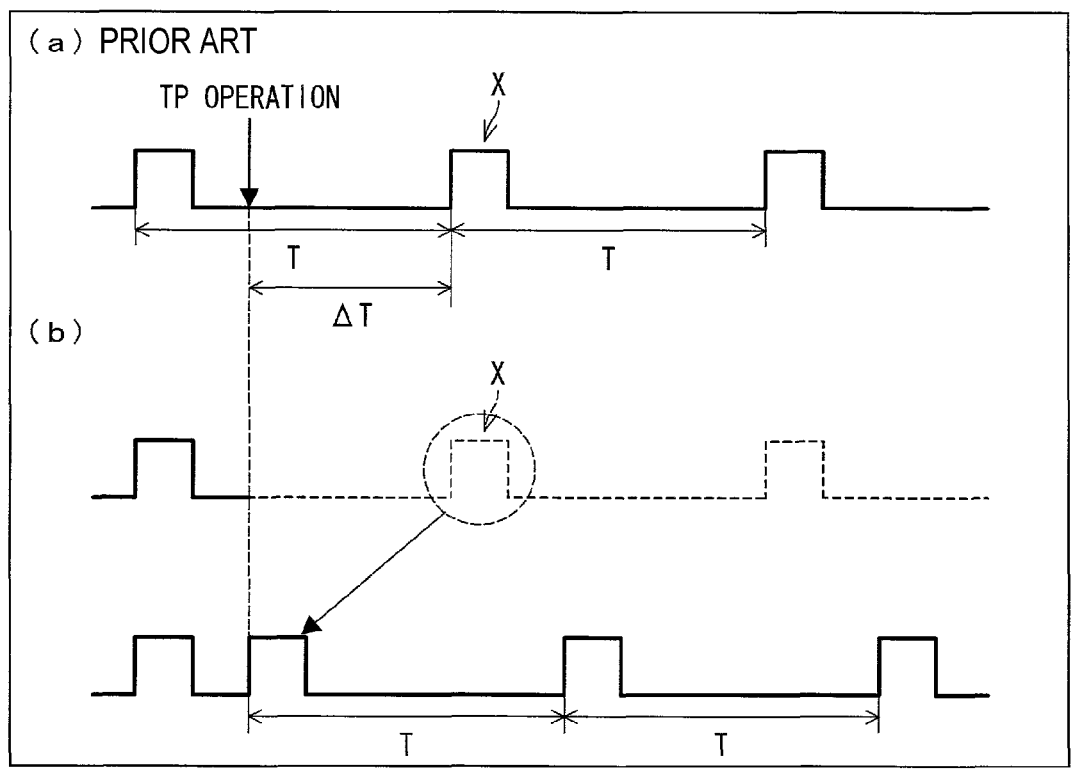

DISPLAY DEVICE, ELECTRONIC APPARATUS, METHOD FOR CONTROLLING DISPLAY DEVICE, AND METHOD FOR CONTROLLING ELECTRONIC APPARATUS

TECHNICAL FIELD

The present invention relates to a display device, a method for controlling a display device, an electronic apparatus including the display device and an input device such as a touch panel, and a method for controlling an electronic apparatus.

BACKGROUND ART

Recently, a larger number of electronic apparatuses such as mobile phones, smart phones, and laptop personal computers have come to mount thin, light-weighted and low-power consuming display devices typified by liquid crystal display devices.

Furthermore, it is expected that electronic paper, which is a thinner display device, will rapidly be developed and prevail in the future. Under such circumstances, nowadays, reduction of power consumption is getting to be an object common to various display devices.

Patent Literature 1 discloses a method for driving a display device having a low power consumption mode intended for reducing power consumption. In the low power consumption mode, there is provided a pause period which is a non-scanning period longer than a scanning period for scanning a screen once and in which all the scanning signal lines are set in a non-scanning state, thereby realizing low power consumption.

CITATION LIST

Patent Literature

[Patent Literature 1]
Japanese Patent Application Publication No. 2001-312253 (published on Nov. 9, 2001)

SUMMARY OF INVENTION

Technical Problem

In a configuration as disclosed in Patent Literature 1 in which a non-scanning period (pause period) is provided, image data indicative of an image displayed on a display screen is not rewritten until a next scanning period comes. Consequently, in a case where a user makes some operation during a non-scanning period so as to, for example, cause the display screen to display an image following an image currently displayed on the display screen, the image currently displayed continues to be displayed on the display screen until the next scanning period comes.

As described above, in a conventional display device, in a case where a user's operation is made during a non-scanning period, image data is not rewritten immediately in response to the user's operation. That is, there is a time lag between timing of the user's operation and timing of image data rewriting (timing of image update) corresponding to the user's operation.

In a case where a non-scanning period (pause period) is relatively long as in the technique of Patent Literature 1, the time lag is large, so that an electronic apparatus responds to the user's operation greatly differently from what the user has intended. This may result in a possibility that the user feels dissatisfied with the electronic apparatus in terms of user-friendliness and operability.

The present invention was made in view of the foregoing problem. An object of the present invention is to provide a display device, a method for controlling a display device, an electronic apparatus including the display device, and a method for controlling an electronic apparatus, each capable of shortening a time lag between timing of a user's operation and timing of image data rewriting (timing of image update) corresponding to the user's operation, while reducing power consumption.

Solution to Problem

In order to solve the foregoing problem, a display device of the present invention is a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, when a detection target is detected by a detection device for detecting a detection target, the scanning periods being arranged such that timing of one of the scanning periods which one scanning period is after and nearest to detection of the detection target is advanced so as to come earlier than timing predetermined for a case where the detection target is not detected, the detection target being at least one of (i) a user's predetermined operation to the electronic apparatus and (ii) a radio wave coming to the electronic apparatus from outside.

Furthermore, in order to solve the foregoing problem, a method of the present invention for controlling a display device is a method for controlling a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, the method including the step of: when a detection target is detected by a detection device for detecting a detection target, advancing timing of one of the scanning periods which is after and nearest to the detection of the detection target so as to come earlier than timing predetermined for a case where the detection target is not detected, the detection target being at least one of (i) a user's predetermined operation to the electronic apparatus and (ii) a radio wave coming to the electronic apparatus from outside.

With the arrangement and the control method, when at least one of (i) the user's predetermined operation to the electronic apparatus including the display device and (ii) the radio wave coming to the electronic apparatus from outside is detected, timing of one of the scanning periods which one scanning period is after and nearest to the detection is advanced so as to come earlier than timing predetermined for a case where the detection target is not detected. This allows eliminating a time lag between timing of detecting the detection target and timing of image data rewriting (timing of image update) corresponding to the detection or making the time lag as short as possible.

This makes it possible to prevent a response of the display device to the user's predetermined operation from greatly differing from what the user has intended, thereby preventing or reducing a user's feel of dissatisfaction with the display device in terms of user-friendliness and operability.

Furthermore, in order to solve the foregoing problem, an electronic apparatus of the present invention is an electronic apparatus, including: a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten; and a detection device for detecting a detection target which is at least one of (i) a user's predetermined operation to the electronic apparatus and (ii) a radio wave coming from outside to the electronic apparatus, when the detection target is detected by the detection device, the detection device shortening a cycle of a detection behavior as compared to a cycle of a detection behavior prior to the detection of the detection target.

Furthermore, in order to solve the foregoing problem, a method of the present invention for controlling an electronic apparatus is a method for controlling an electronic apparatus including: (i) a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, and (ii) a detection device for detecting a detection target which is at least one of a user's predetermined operation to the electronic apparatus and a radio wave coming from outside to the electronic apparatus, the method including the step of: when the detection target is detected by the detection device, shortening a cycle of a detection behavior as compared to a cycle of a detection behavior prior to the detection of the detection target.

Examples of the method for approximating as much as possible timing of image data update corresponding to the detection to timing of the detection include (i) accelerating the nearest scanning period, and (ii) in a configuration where a process of detecting the detection target is carried out periodically (intermittently), detecting the detection target as early as possible.

Accordingly, with an arrangement in which when the detection target is detected, a cycle of the detection behavior is shortened as compared to a cycle of a detection behavior prior to the detection of the detection target, it is possible to detect, as early as possible, a detection target which may possibly follow the aforementioned detection target.

This makes it possible to prevent a response of an electronic apparatus to the user's predetermined operation from greatly differing from what the user has intended, at the time when the user's predetermined operation is made to the electronic apparatus after acceleration of the nearest scanning period. This consequently can prevent or reduce a user's feel of dissatisfaction with the electronic apparatus in terms of user-friendliness and operability.

Advantageous Effects of Invention

The display device of the present invention is a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, when a detection target is detected by a detection device for detecting a detection target, the scanning periods being arranged such that timing of one of the scanning periods which one scanning period is after and nearest to detection of the detection target is advanced so as to come earlier than timing predetermined for a case where the detection target is not detected, the detection target being at least one of (i) a user's predetermined operation to the electronic apparatus and (ii) a radio wave coming to the electronic apparatus from outside.

The method of the present invention for controlling a display device is a method for controlling a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, the method including the step of: when a detection target is detected by a detection device for detecting a detection target, advancing timing of one of the scanning periods which is after and nearest to the detection of the detection target so as to come earlier than timing predetermined for a case where the detection target is not detected, the detection target being at least one of (i) a user's predetermined operation to the electronic apparatus and (ii) a radio wave coming to the electronic apparatus from outside.

With the arrangement and the control method, it is possible to eliminate a time lag between timing of detecting the detection target and timing of image data rewriting (timing of image update) corresponding to the detection or to make the time lag as short as possible.

The electronic apparatus of the present invention is an electronic apparatus, including: a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten; and a detection device for detecting a detection target which is at least one of (i) a user's predetermined operation to the electronic apparatus and (ii) a radio wave coming from outside to the electronic apparatus, when the detection target is detected by the detection device, the detection device shortening a cycle of a detection behavior as compared to a cycle of a detection behavior prior to the detection of the detection target.

Furthermore, the method of the present invention for controlling an electronic apparatus is a method for controlling an electronic apparatus including: (i) a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, and (ii) a detection device for detecting a detection target which is at least one of a user's predetermined operation to the electronic apparatus and a radio wave coming from outside to the electronic apparatus, the method including the step of: when the detection target is detected by the detection device, shortening a cycle of a detection behavior as compared to a cycle of a detection behavior prior to the detection of the detection target.

With the arrangement and the control method, a detection target which may possibly be carried out after the detection of the aforementioned detection target can be detected as early as possible.

BRIEF DESCRIPTION OF DRAWINGS (a) of FIG. 1 is a timing chart showing a driving mode of a conventional display panel section. (b) of FIG. 1 is a timing chart showing a driving mode of a display panel section in accordance with First Embodiment.

Figure 4:
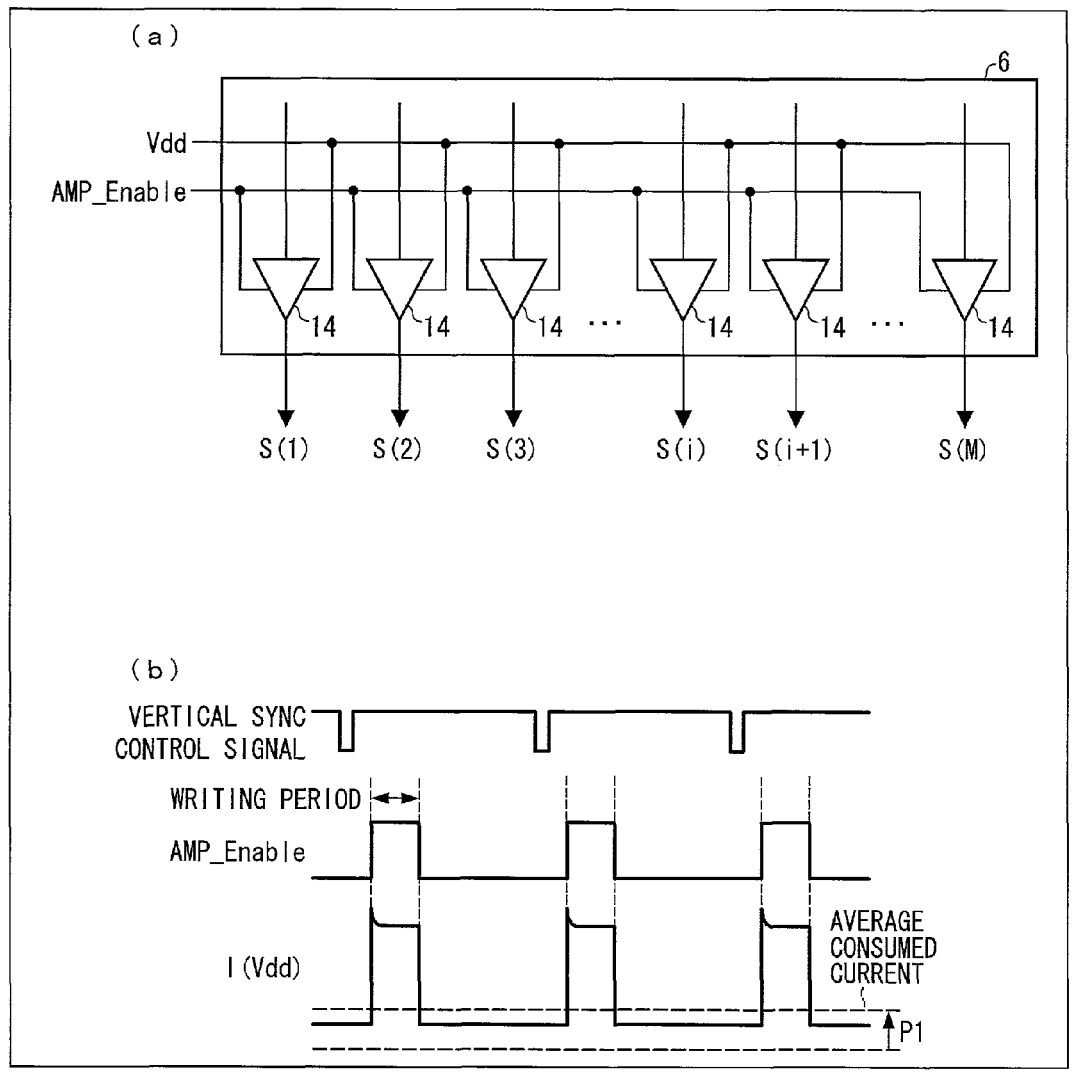

(a) of FIG. 4 is a view showing an internal configuration of a signal line driving circuit, particularly an output part of the signal line driving circuit. (b) of FIG. 4 is a view showing a waveform of an AMP_Enable signal.

Figure 5:
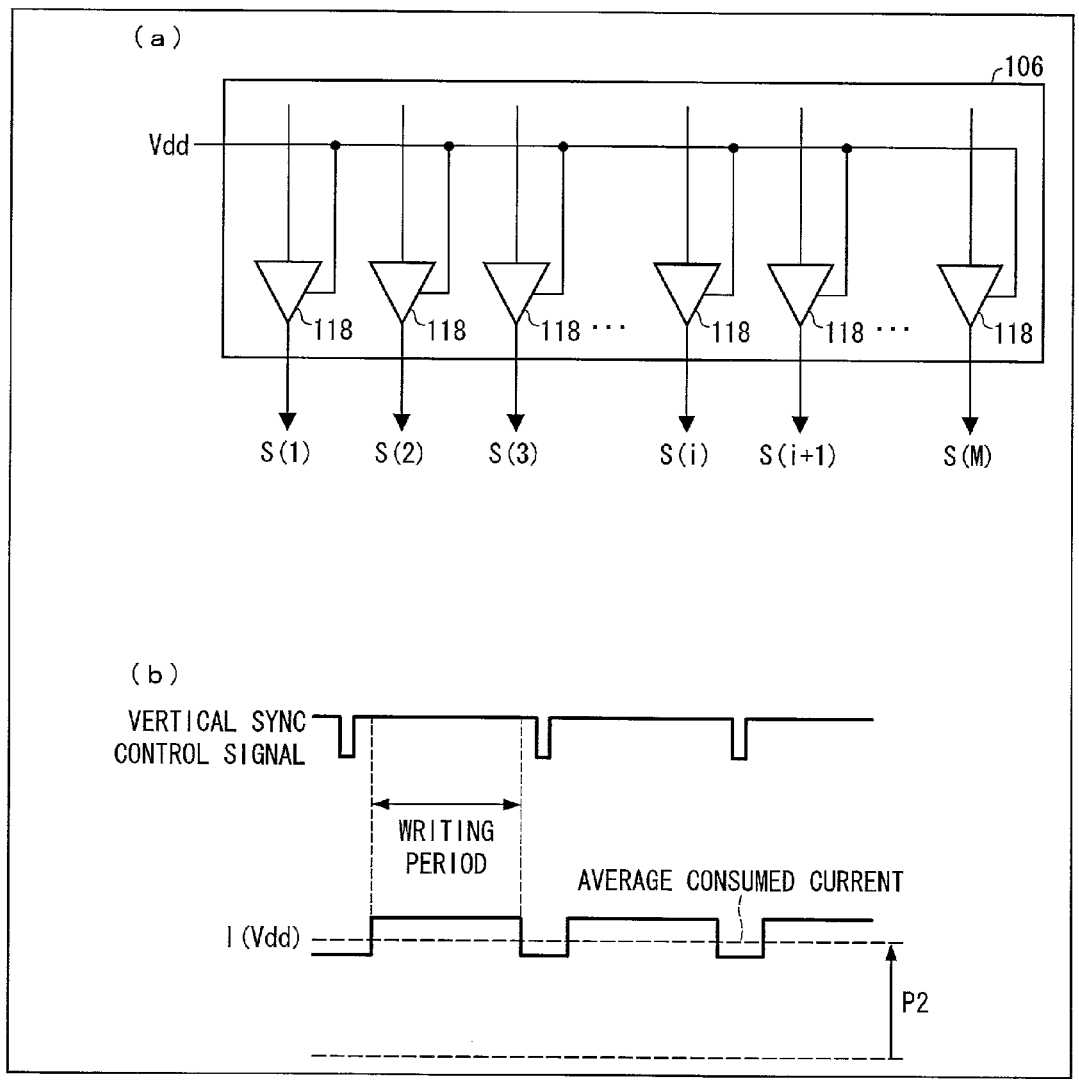

(a) of FIG. 5 is a view showing an internal configuration of a signal line driving circuit of a conventional display device, particularly an output part of the signal line driving circuit. (b) of FIG. 5 is a view showing a waveform of a consumed current in the signal line driving circuit of the conventional display device.

Figure 6:
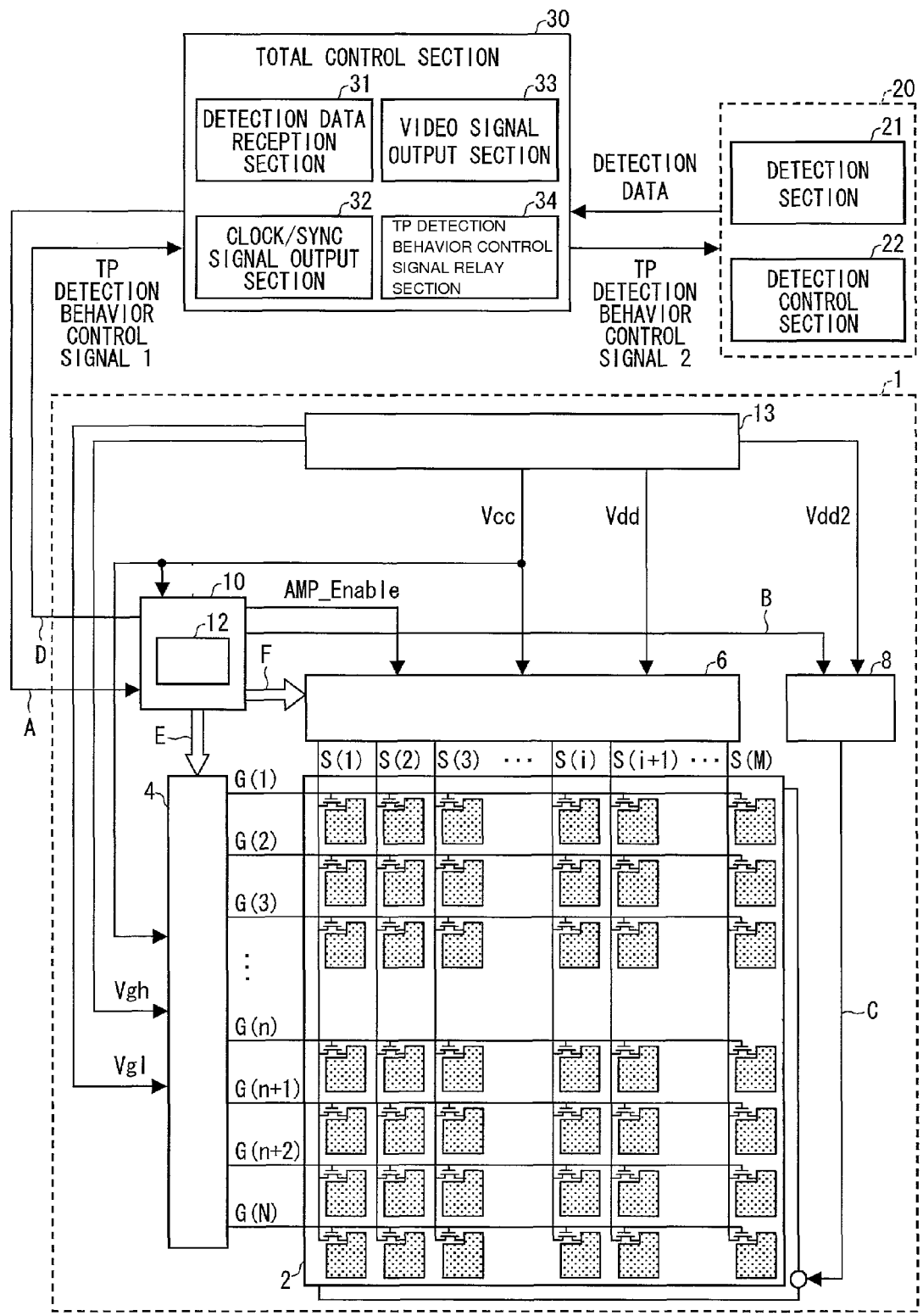

FIG. 6 is a view showing another example of a whole configuration of the electronic apparatus of the present invention.

Figure 7:
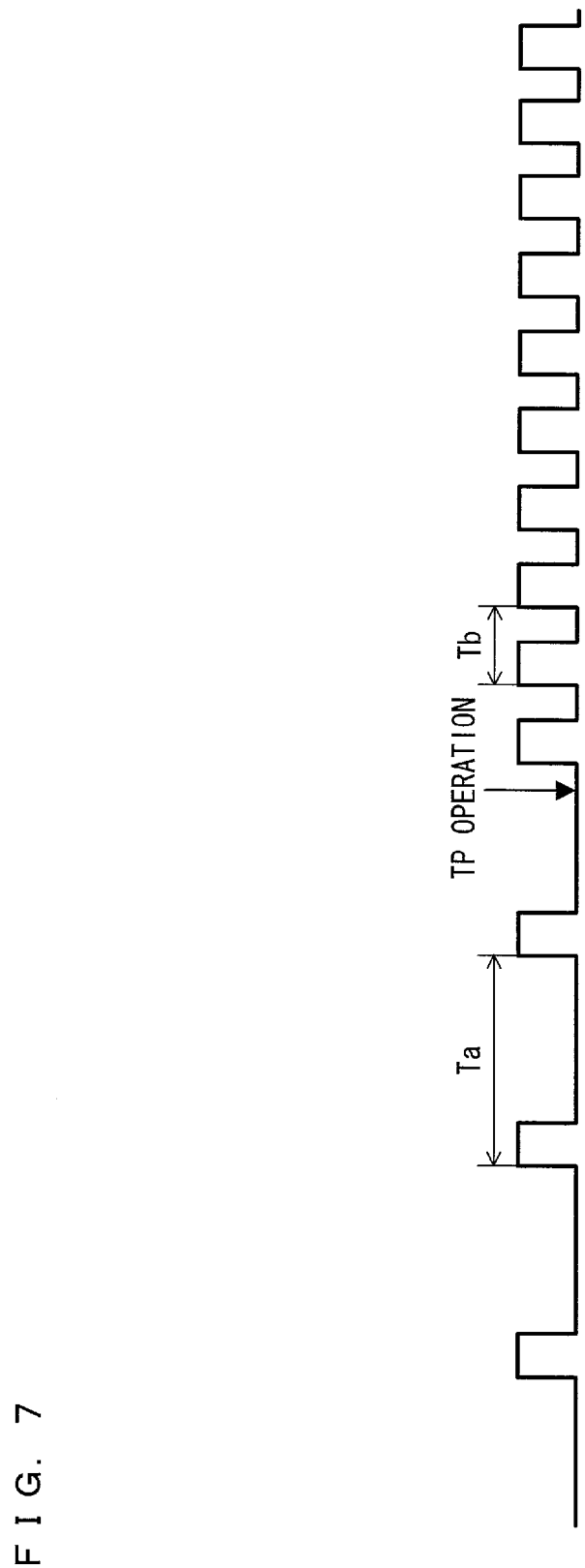

FIG. 7 is a timing chart showing a driving mode of a display panel section in accordance with Second Embodiment.

Figure 8:
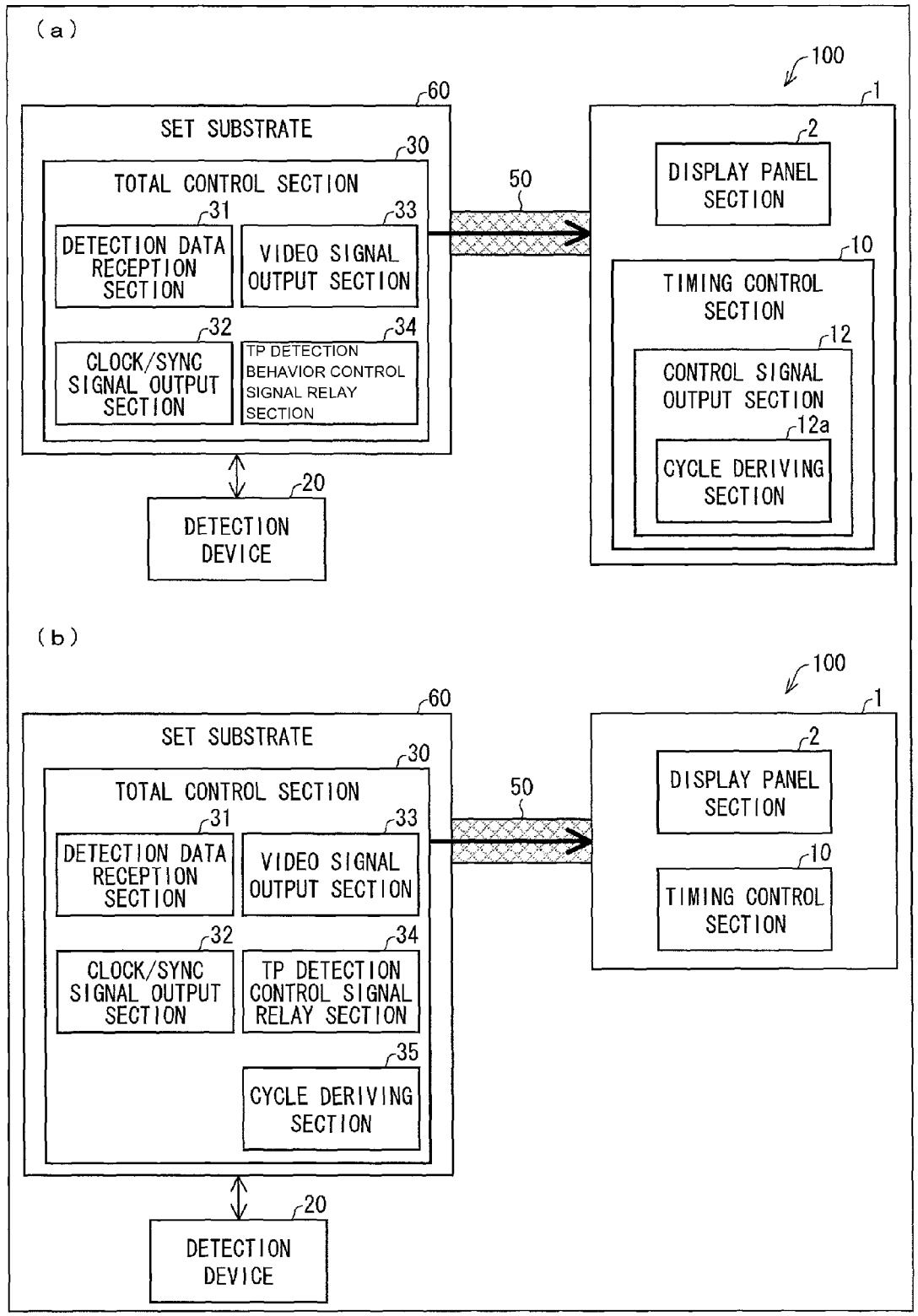

(a) of FIG. 8 is a view showing a configuration in which a display device obtains a cycle to which a current cycle is to be changed. (b) of FIG. 8 is a view showing a configuration in which a total control section obtains a cycle to which a current cycle is to be changed.

Figure 9:
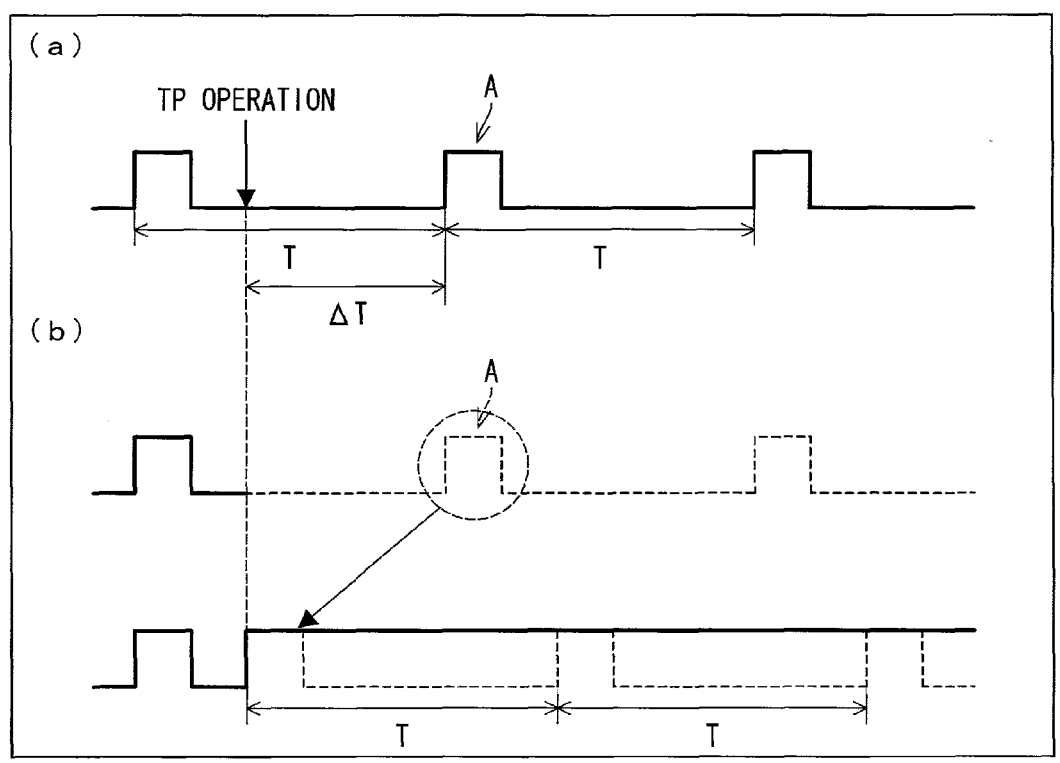

(a) of FIG. 9 is a timing chart showing a driving mode of a conventional display panel section. (b) of FIG. 9 is a timing chart showing a driving mode of a display panel section in accordance with Fourth Embodiment.

Figure 10:
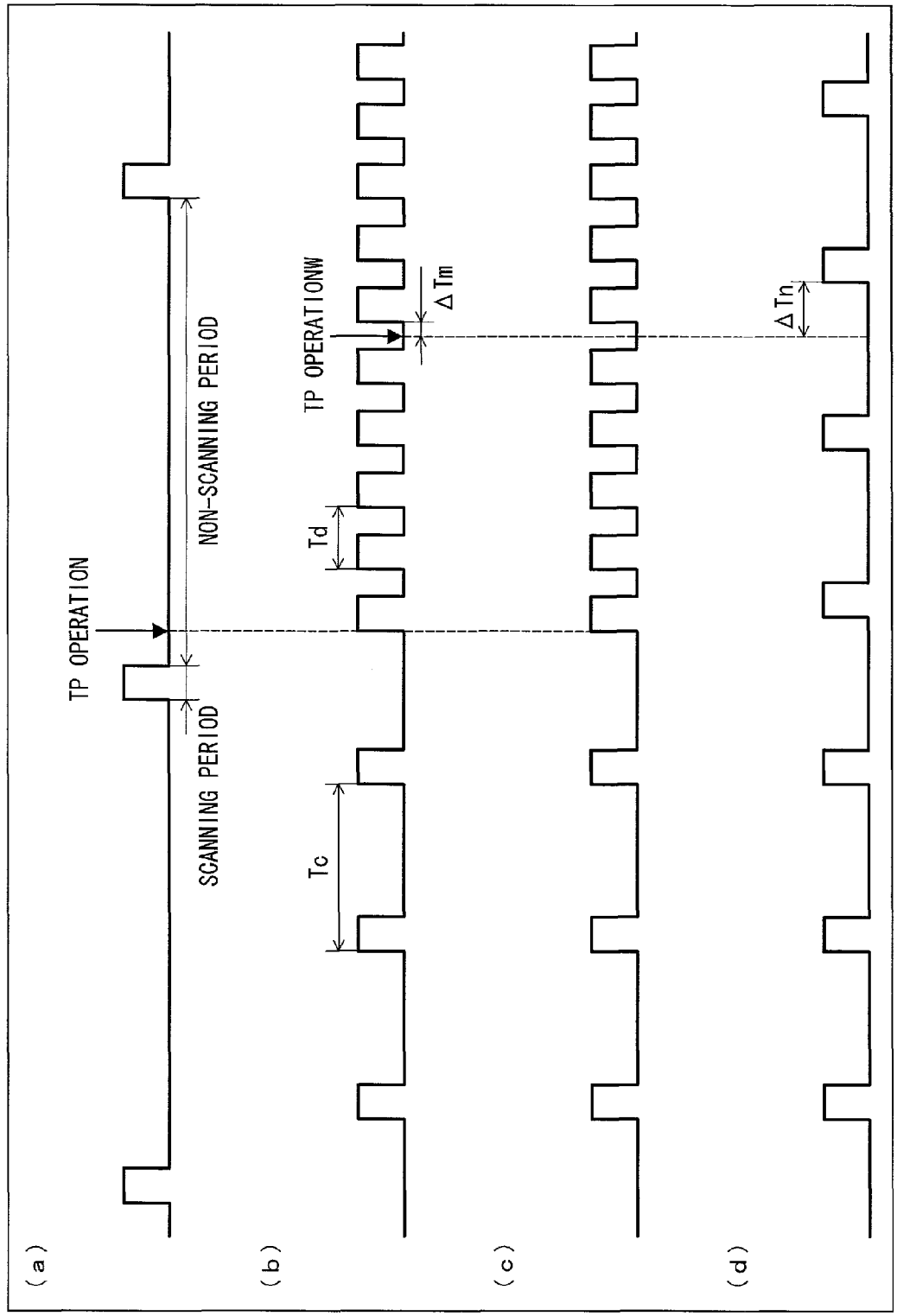

(a) of FIG. 10 is a timing chart showing a driving mode of a display panel section, (b) of FIG. 10 is a timing chart showing a TP detection behavior control signal in accordance with Fifth Embodiment, (c) of FIG. 10 is a timing chart showing a TP operation detecting behavior, and (d) of FIG. 10 is a timing chart showing a conventional TP operation detecting behavior.

Figure 11:
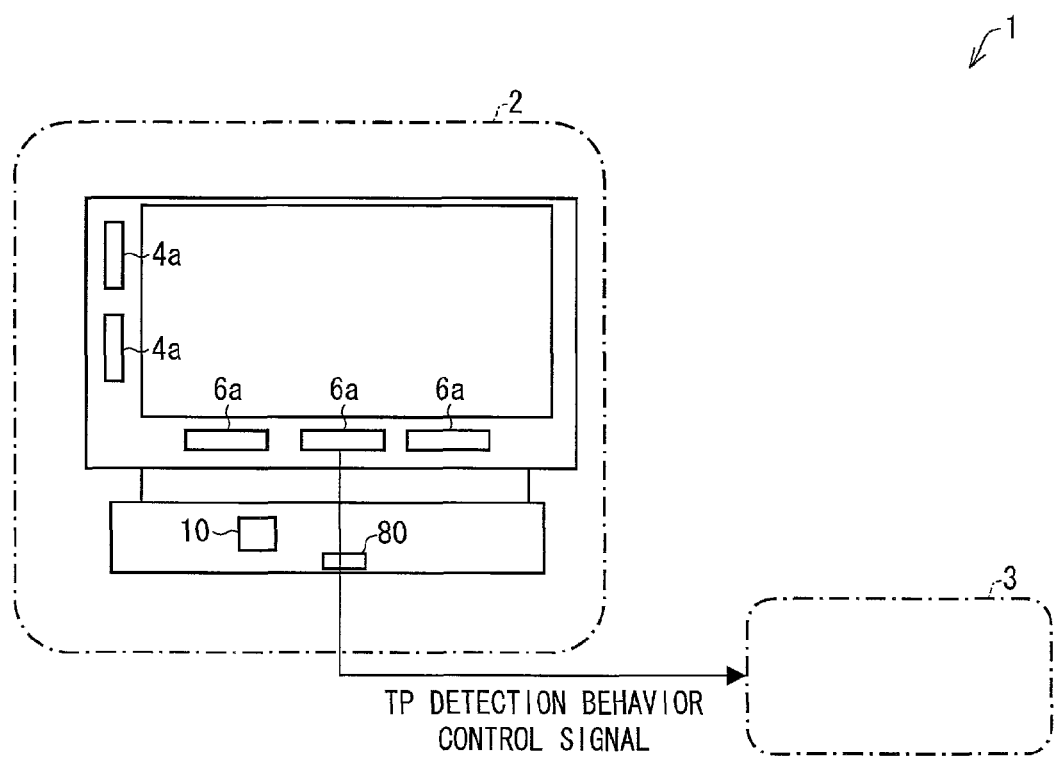

FIG. 11 is an explanatory view showing a modified example of the electronic apparatus of the present invention.

Figure 12:
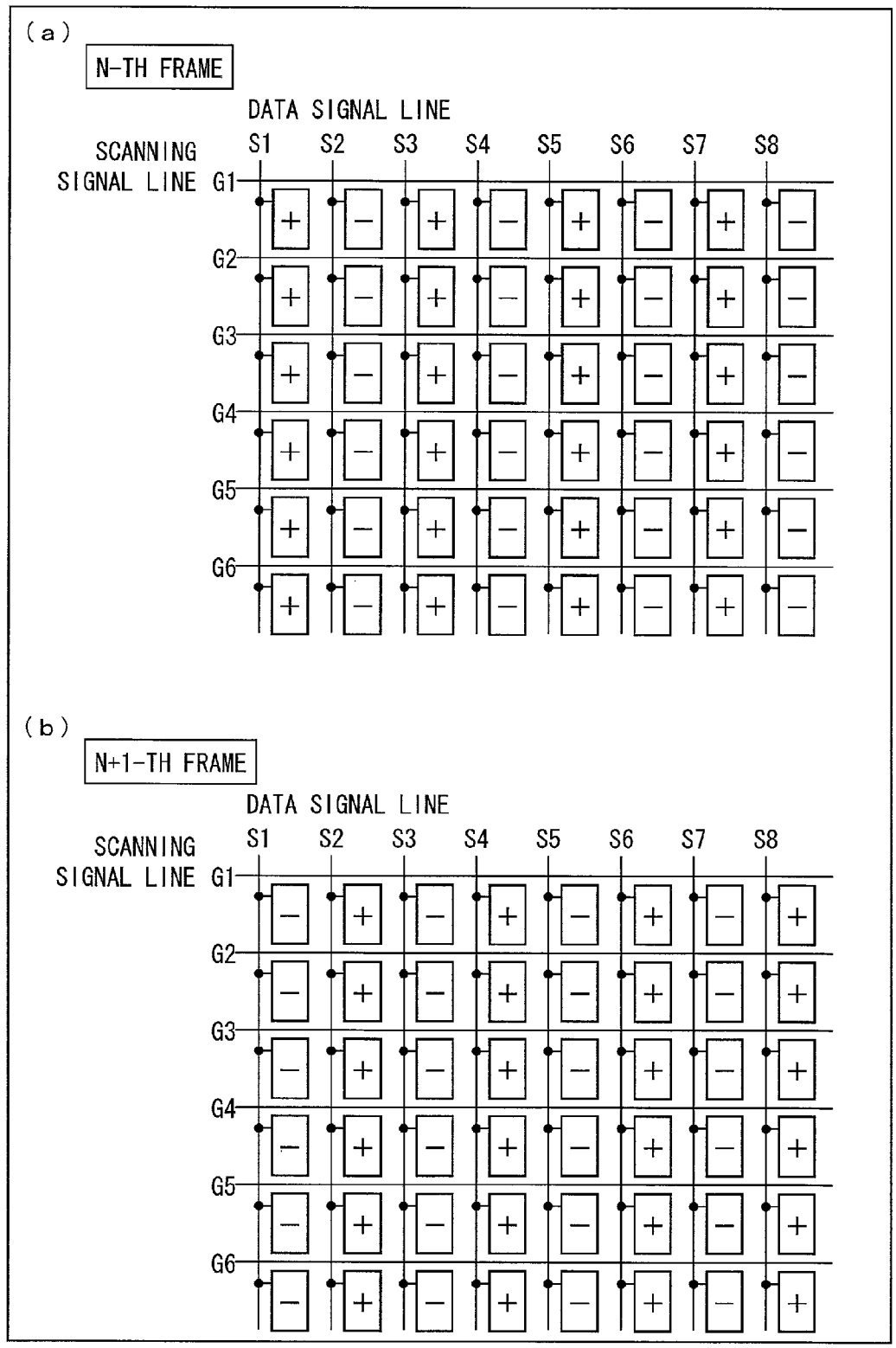

FIG. 12 is a view showing an example of source inversion.

Figure 13:
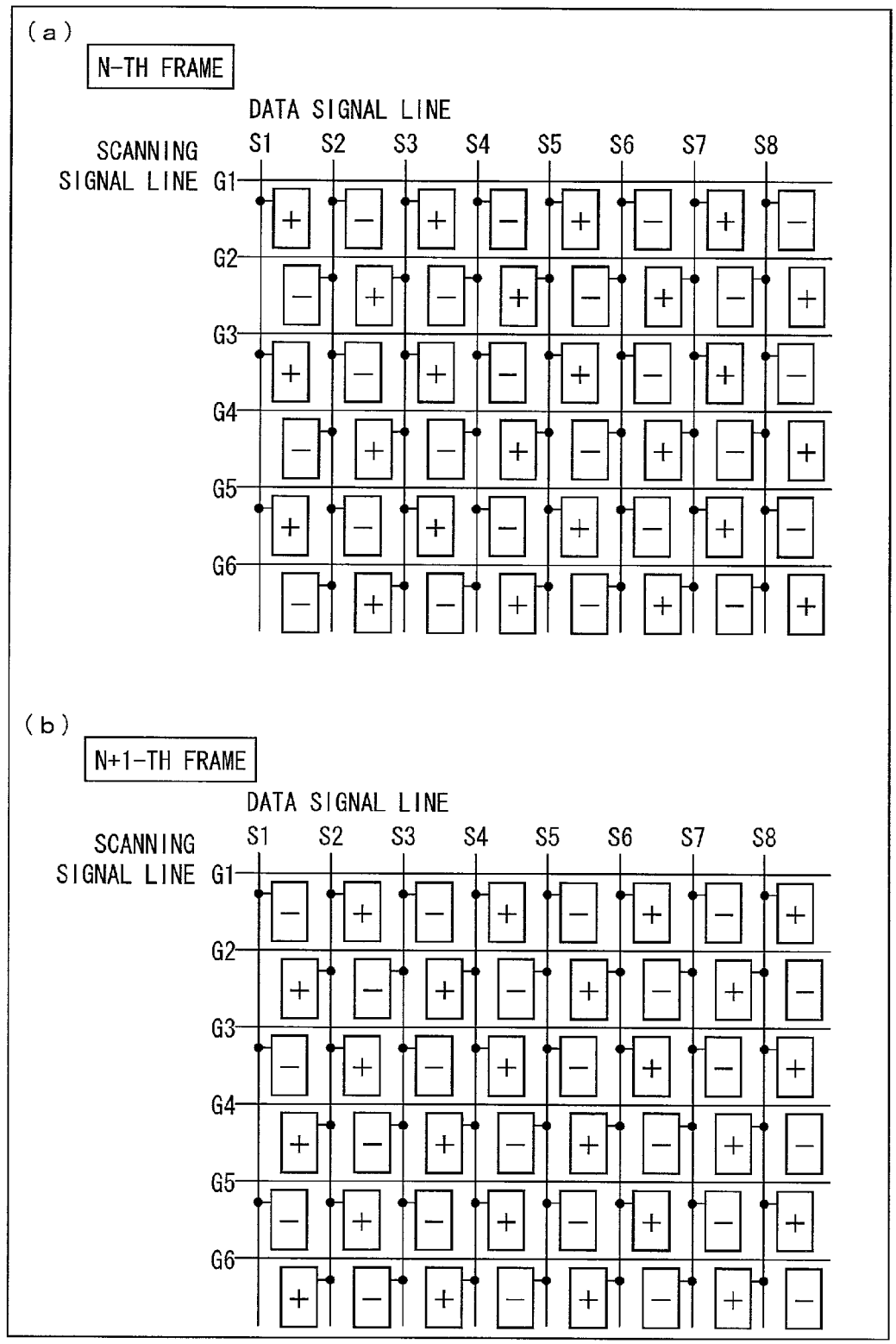

FIG. 13 is a view showing an example of source inversion in a case where pixel electrodes are positioned differently from those in FIG. 12.

Figure 14:
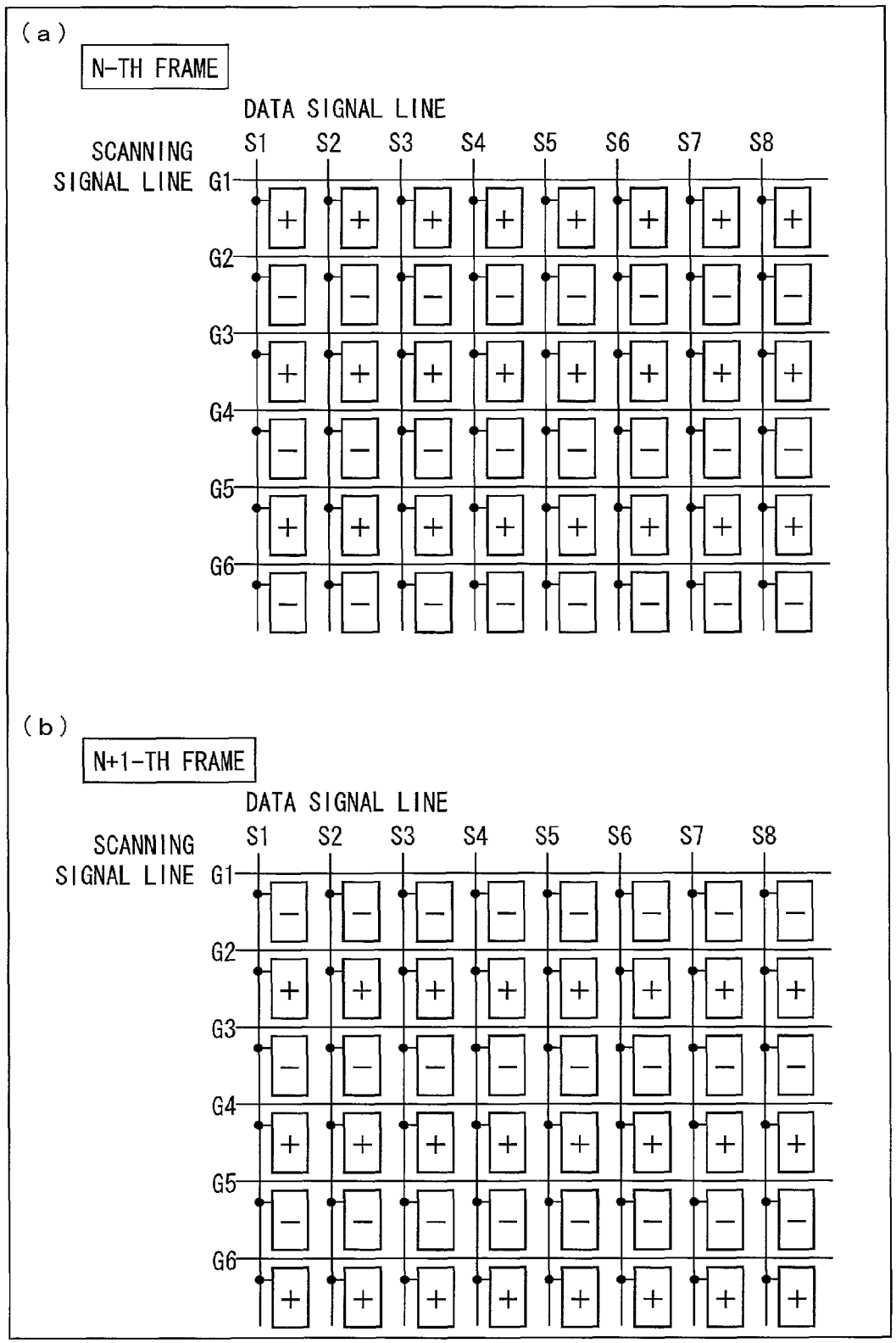

FIG. 14 is a view showing an example of line inversion.

Figure 15:
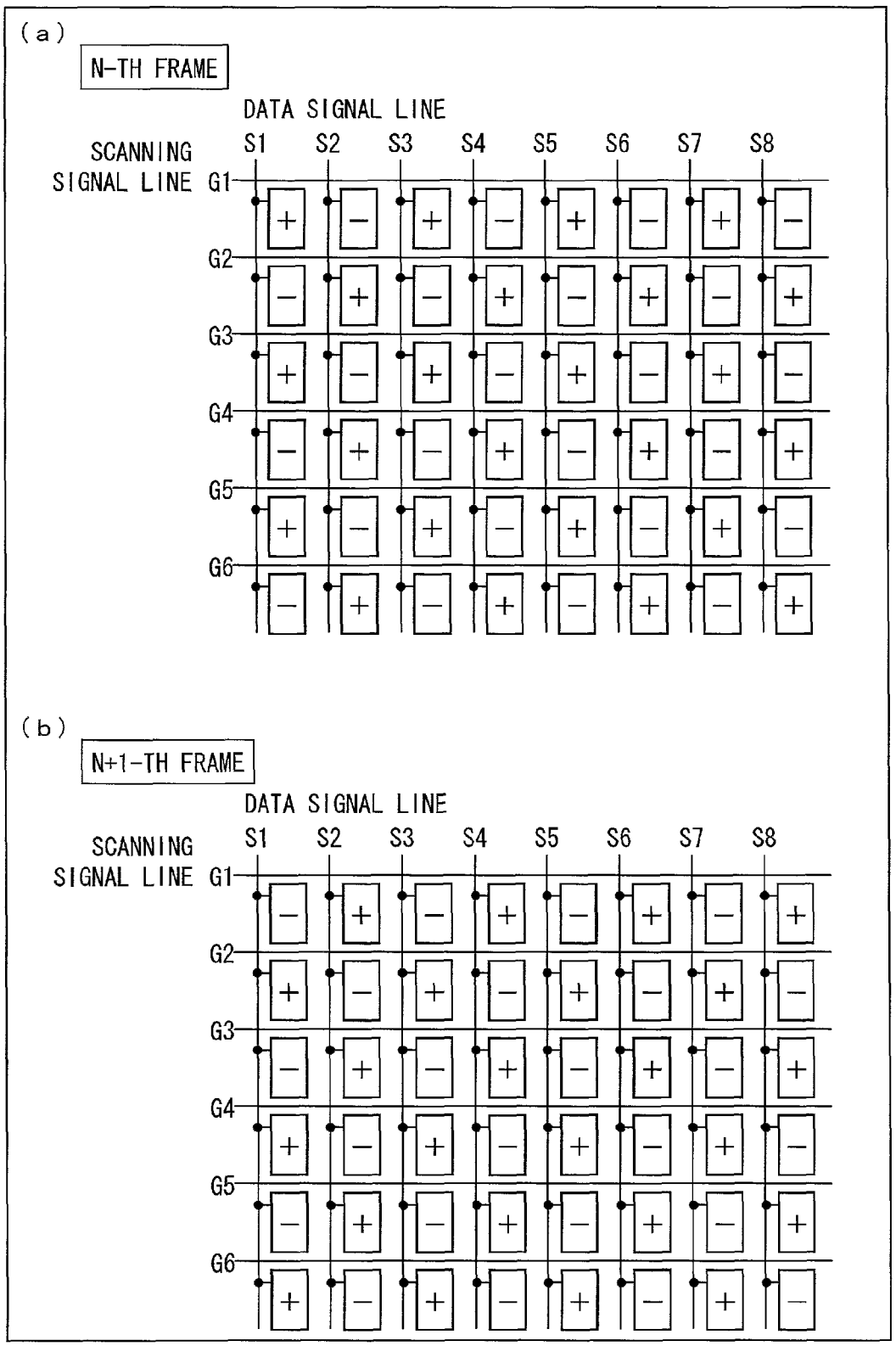

FIG. 15 is a view showing an example of dot inversion.

Figure 16:
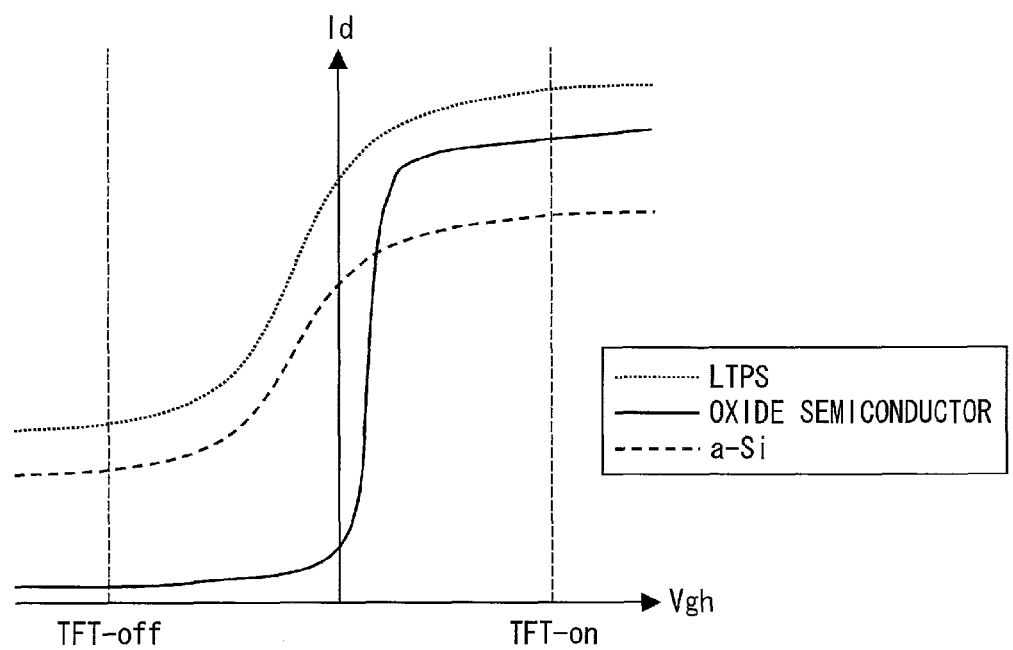

FIG. 16 is a graph showing characteristics of TFTs included in a display section of a display device of the electronic apparatus. To be specific, FIG. 16 is a graph showing characteristics of an amount of a current between a source and a drain with respect to a voltage value of an on-voltage that is to be supplied to a gate of each of TFTs using an oxide semiconductor, TFTs using a-Si, and TFTs using LTPS.

DESCRIPTION OF EMBODIMENTS

The following description will discuss embodiments of the present invention with reference to FIGS. 1 to 16.

First Embodiment (Description on Configuration of Electronic Apparatus 100)

Figure 2:
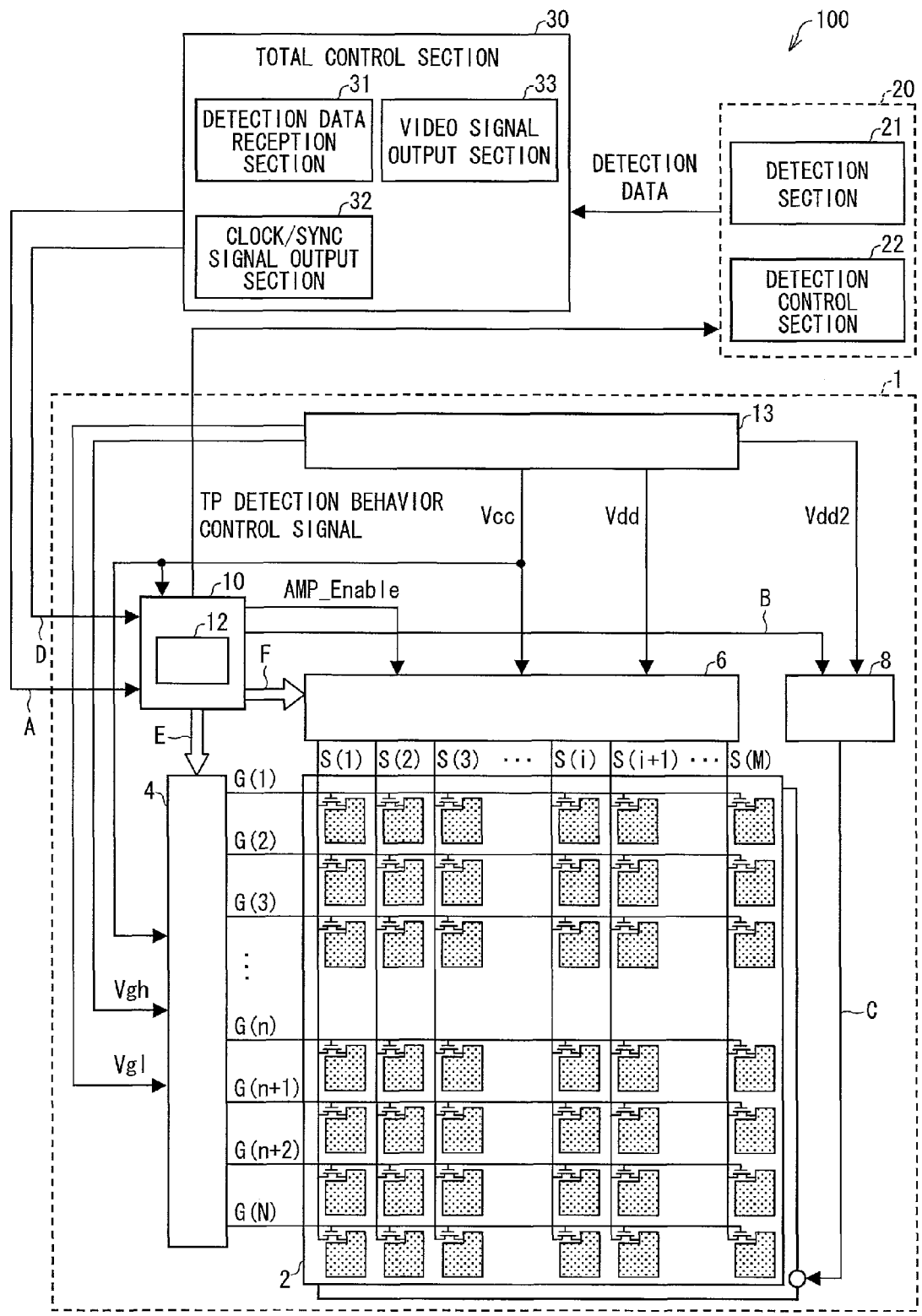
FIG. 2 is a view showing an example of a whole configuration of an electronic apparatus in accordance with the present invention.

The following description will discuss a configuration of an electronic apparatus 100 in accordance with the present embodiment with reference to FIG. 2. FIG. 2 is a view showing an electric configuration of the electronic apparatus 100.

Conceivable examples of the electronic apparatus 100 include mobile phones, smart phones, laptop personal computers, and display devices such as organic EL devices and liquid crystal display devices. As shown in FIG. 2, the electronic apparatus 100 includes a display device 1, a detection device 20, and a total control section 30.

The display device 1 includes a display panel section 2, a scanning line driving circuit (gate driver) 4, a signal line driving circuit (source driver) 6, a common electrode driving circuit 8, a timing controller 10, and a power generation circuit 13. The timing controller 10 includes a control signal output section 12.

The display panel section 2 has a screen including a plurality of pixels arranged in a matrix manner, N (N is any integer) scanning signal lines G (gate lines) each for scanning the screen by sequentially selecting each line, and M (M is any integer) data signal lines S (source lines) each for supplying a data signal to pixels of one row in a selected line. The scanning signal lines G and the data signal lines S intersect each other. The display panel section 2 corresponds to display elements.

G(n) in FIG. 2 indicates an n-th (n is any integer) scanning signal line G. For example, scanning signal lines G(1), G(2), and G(3) indicate first scanning signal line G, second scanning signal line G, and third scanning signal line G, respectively. S(i) indicates an i-th (i is any integer) data signal line S. For example, data signal lines S(1), S(2), and S(3) indicate first data signal line S, second data signal line S, and third data signal line S, respectively.

In the present embodiment, for convenience, driving of an equivalent circuit is used as an example. Each pixel in the display panel section 2 includes a TFT, and a drain electrode of the TFT is connected with a pixel electrode.

The scanning line driving circuit 4 sequentially scans the scanning signal lines G from the top to the bottom of the screen. At that time, the scanning line driving circuit 4 sequentially outputs, to each of the scanning signal lines G, a rectangular wave (gate clock signal (selection signal)) for bringing a switching element (TFT) included in a pixel and connected with a pixel electrode into an on-state. This brings pixels of one row in the screen into a selected state.

The signal line driving circuit 6 calculates values of voltages to be supplied to pixels of the selected one row, on the basis of a video signal (arrow F in FIG. 2) supplied from the timing controller 10, and then supplies the voltages of the values thus calculated to the respective data signal lines S. Consequently, image data is supplied to pixels on the selected scanning signal line G.

The display device 1 further includes a common electrode (COM; not shown) provided with respect to pixels in the screen. In accordance with a polarity inversion signal (arrow B) supplied from the timing controller 10, the common electrode driving circuit 8 supplies, to the common electrode, a predetermined common voltage so as to drive the common electrode.

The timing controller 10 receives, as input video sync signals, a horizontal sync signal (Hsync) and a vertical sync signal (Vsync) (arrow A). In accordance with thus received clock, vertical sync signal Vsync, and horizontal sync signal Hsync, the timing controller 10 generates, as video sync signals based on which individual circuits operate in synchronization with each other, a horizontal sync control signal (GCK etc.) and a vertical sync control signal (GSP etc.). The timing controller 10 supplies the horizontal sync control signal (GCK etc.) and the vertical sync control signal (GSP etc.) thus generated to the scanning line driving circuit 4 and the signal line driving circuit 6 (arrows E and F).

The timing controller 10 supplies the horizontal sync control signal and the vertical sync control signal to the scanning line driving circuit 4. Furthermore, the timing controller 10 supplies the horizontal sync control signal and a video signal corresponding to an input image to the signal line driving circuit 6.

In the signal line driving circuit 6, the horizontal sync control signal is used as an output timing signal for controlling timing of supply of an input video signal to the display panel section 2. In the scanning line driving circuit 4, the horizontal sync control signal is used as a timing signal for controlling timing of supply of a gate clock signal (selection signal) to the display panel section 2. In the scanning line driving circuit 4, the vertical sync control signal is also used as a timing signal for controlling timing of start of scanning of the scanning signal lines G.

In the specification, unless otherwise stated, "one vertical period" indicates a period defined by the vertical sync control signal, and "one horizontal period" indicates a period defined by the horizontal sync control signal.

The scanning line driving circuit 4 starts scanning of the display panel section 2 in accordance with the horizontal sync control signal and the vertical sync control signal which have been received from the timing controller 10. In the scanning, the scanning line driving circuit 4 sequentially selects the scanning signal lines G, and supplies a gate clock signal (selection signal) thereto.

In accordance with the horizontal sync control signal (writing instruction signal) having been received from the timing controller 10, the signal line driving circuit 6 writes, in the data signal lines S of the display panel section 2, image data (data signal) based on the video signal received from the timing controller 10.

The power generation circuit 13 generates voltages Vdd, Vdd2, Vcc, Vgh, and Vgl which are required for operation of individual circuits in the display device 1. Then, the power generation circuit 13 outputs the voltages Vcc, Vgh, and Vgl to the scanning line driving circuit 4, the voltages Vdd and Vcc to the signal line driving circuit 6, the voltage Vcc to the timing controller 10, and the voltage Vdd2 to the common electrode driving circuit 8.

(Description on Detection Device 20)

As shown in FIG. 2, the detection device 20 is communicably connected with the display device 1 and the total control section 30. The detection device 20 includes a detection section 21 for detecting a user's predetermined operation with respect to the electronic apparatus 100; and a detection control section 22 for controlling the performance of the detection section 21.

In the present embodiment, the detection section 21 is, for example, a touch panel, particularly a projected capacitive touch panel, and is provided on a display screen of the display device 1. The predetermined operation is supposed to be a contact with (touch on) the touch panel or an approach to the touch panel.

In the case of the projected capacitive touch panel, the detection section 21 is made up of (i) a transparent substrate made of, for example, glass or plastic and (ii) transparent electrode patterns, made of ITO (Indium Tin Oxide), arranged in a matrix manner and formed on the transparent substrate. When a user's finger or the like touches or approaches a certain position of the detection section 21, capacitances at a plurality of transparent electrode patterns on and around that position change. The detection control section 22 detects a change in current or voltage of the transparent electrode patterns, thereby detecting the position where the user's finger or the like touches or approaches.

Note that the touch panel may detect that a user's finger or the like has touched or approached any position on the screen. In this case, the touch panel needs only to detect the touch or the approach, and does not need to detect the position where the touch or the approach is made.

The detection device 20 detects a touch or an approach of a finger of a human including a user of the electronic apparatus 100 or a stylus (pen). In response to tracing (touching) of the detection device 20 with the human finger or the stylus, the detection device 20 detects a human's operation corresponding to the tracing movement (touching movement).

It should be noted that the aforementioned "human" is not limited to a user of the electronic apparatus 100. For example, an observer or the like who observes the display device 1 of the electronic apparatus 100 together with the user of the electronic apparatus 100 is also encompassed in the aforementioned "human".

The touch panel is influenced by noise caused by scanning of the display device 1. Accordingly, in a case of using the touch panel as the detection device, it is possible to employ a configuration in which when a detection target is detected, timing of a scanning period after and nearest to the detection is advanced so as to come earlier than timing of a scanning period predetermined for a case where the detection target is not detected. This configuration allows detecting the detection target with high detection accuracy particularly in a non-scanning period.

Examples of the detection device 20 in a form other than a touch panel include an RF (Radio Frequency) circuit for detecting a radio wave coming from an external device (from outside the display device 1 (or from outside the electronic apparatus 1)). The RF circuit is influenced by EMI (Electro-Magnetic Interference) emitted from the display device 1. Accordingly, designing the RF circuit to carry out detection in a non-scanning period allows obtaining better detection data.

In the case where the detection device 20 is an RF circuit, a radio wave coming from an external device is detected (received) by the detection device 20. Accordingly, the detection device 20 may include an antenna (not shown).

The detection control section 22 receives, from the timing controller 10, a signal (hereinafter, referred to as "TP detection behavior control signal") for controlling a detection process of detecting whether a touching operation (hereinafter, referred to as "TP operation") is made or not. In sync with the received TP detection behavior control signal, the detection control section 22 carries out a detection process of detecting whether a TP operation is made on the touch panel or not. The detection control section 22 supplies, to the total control section 30, detection data indicative of a result of the detection process.

(Description on Total Control Section 30)

The total control section 30 is mounted on a set-side substrate 60 (see (a) and (b) of FIG. 8). The total control section 30 totally controls (controls a whole of) the electronic apparatus 100. The total control section 30 includes a CPU (Central Processing Unit) and storage sections. The CPU executes instructions in control programs realizing individual functions. The storage sections include a ROM (Read Only Memory) which contains the control programs, a RAM (Random Access Memory) to which the control programs are loaded, and a memory containing the control programs and various data.

The total control section 30 realizes the functions of respective functional blocks by the CPU executing predetermined control programs stored in the storage sections. Specifically, the total control section 30 has a function of a detection data reception section 31 for receiving detection data from the detection control section 22; a function of a clock/sync signal output section 32 for outputting a clock, a vertical sync signal Vsync, and a horizontal sync signal Hsync to the timing controller 10 of the display device 1; and a function of a video signal output section 33 for outputting a video signal to the signal line driving circuit 6 of the display device 1.

(Power Consumption in Conventional Display Device)

With reference to FIG. 5, the following description will discuss a problem of power consumption in a conventional display device. (a) of FIG. 5 is a view showing an internal configuration regarding an output part of the signal line driving circuit 106. (b) of FIG. 5 is a view showing a waveform of a consumed current (I(Vdd)) in the signal line driving circuit 106. Assume, for example, a display device with a general resolution WSVGA (1024RGB×600). A signal line driving circuit 106 of such a display device requires 1024×3 (RGB) =3072 analog amplifiers 118. Each of the analog amplifiers 118 is an element for supplying a data signal to the data signal line S. A constant steady current of approximately 0.01 mA flows in each of the analog amplifiers 118 so that output performance is secured.

Accordingly, the total amount of the constant steady currents flowing in 3072 analog amplifiers 118 is approximately 30.7 mA. Since a voltage source (Vdd) supplied to the signal line driving circuit 106 is normally approximately 10 V, the signal line driving circuit consumes a power of 10 V×30.7 mA=307 mW. As a result, a value of an average consumed current is as indicated by an arrow P2 of (b) of FIG. 5. This value occupies a considerable amount of the power consumption in the display device as a whole. This is one great factor which prevents the display device from having lower power consumption.

(Power Consumption in Display Device 1)

The display device 1 in accordance with the present embodiment operates with an average power smaller than a power for the conventional display device. This point is explained below with reference to FIG. 4.

(a) of FIG. 4 is a view showing an internal configuration of the signal line driving circuit 6, particularly an output part thereof. (b) of FIG. 4 is a view showing a waveform of an AMP_Enable signal.

As shown in (a) of FIG. 4, the signal line driving circuit 6 includes a plurality of analog amplifiers 14. The analog amplifiers 14 each are provided to each data signal line S. Accordingly, the signal line driving circuit 6 in accordance with First Embodiment includes M analog amplifiers 14. That is, the number of the analog amplifiers 14 is equal to the number of the data signal lines S.

The signal line driving circuit 6 further includes an AMP_Enable signal line for supplying an AMP_Enable signal to the analog amplifiers 14. The AMP_Enable signal line is connected with the control signal output section 12 of the timing controller 10. In the signal line driving circuit 6, the analog amplifiers 14 are connected with one another in parallel.

As described above, Vdd is a voltage source supplied from the power source generation circuit 13 in the display device 1. The signal line driving circuit 6 and the analog amplifiers 14 therein operate by receiving Vdd supply.

The control signal output section 12 of the timing controller 10 supplies, at predetermined timing, an AMP_Enable signal to each of the analog amplifiers 14 of the signal line driving circuit 6. The AMP_Enable signal is a control signal defining an operating state of each analog amplifier 14. The analog amplifier 14 operates while the AMP_Enable signal is at an H value, and pauses while the AMP_Enable signal is at an L value.

In driving the display panel section 2, the display device 1 divides one vertical period defined by the vertical sync control signal into a scanning period and a non-scanning period. As shown in (b) of FIG. 4, in the scanning period, the control signal output section 12 sets the AMP_Enable signal at an H value so that the analog amplifier 14 operates. In the non-scanning period, the control signal output section 12 sets the AMP_Enable signal at an L value so that the analog amplifier 14 pauses.

<Signal Waveform>

Figure 3:
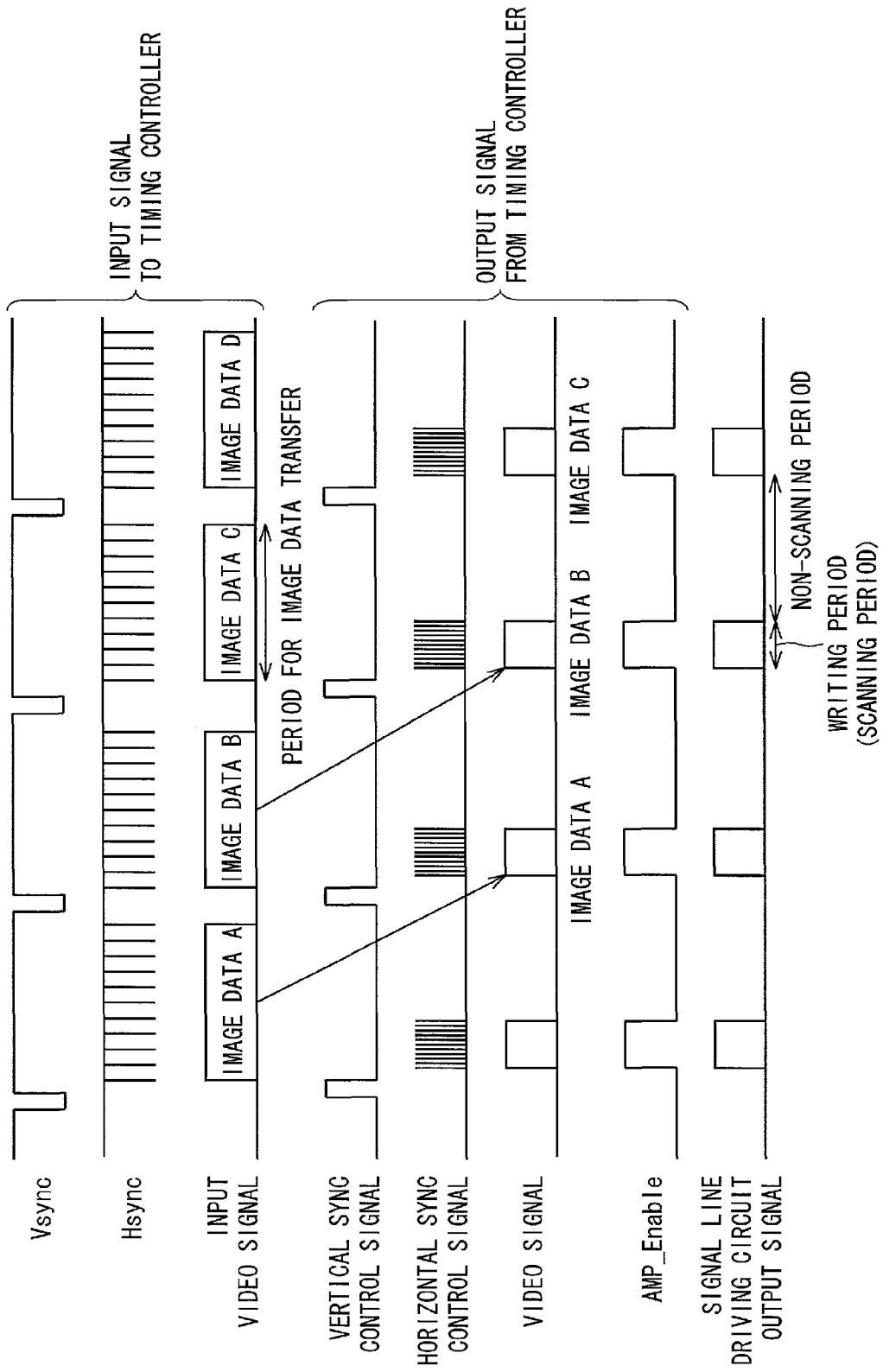
FIG. 3 is a view showing waveforms of signals in driving a display panel section of a display device in an electronic apparatus of the present invention.

With reference to FIG. 3, the following description will discuss waveforms of various signals in driving the display panel section 2. FIG. 3 is a view showing waveforms of the various signals in driving the display panel section 2 of the display device 1.

The upper part of FIG. 3 shows input signals inputted to the timing controller 10. For example, the timing controller 10 receives, as input video sync signals, a vertical sync signal (Vsync) and a horizontal sync signal (Hsync). Furthermore, the timing controller 10 receives a video signal together with the input video sync signals. A period for one-frame image data transfer of a video signal corresponds to one vertical period defined by Hsync.

Meanwhile, the lower part of FIG. 3 shows output signals outputted from the timing controller 10.

For example, in accordance with the input video sync signal inputted to the timing controller 10, the timing controller 10 generates the horizontal sync control signal and the vertical sync control signal as video sync signals based on which individual circuits operate in sync with each other. The vertical sync control signal generated by the timing controller 10 here has the same cycle as Vsync inputted to the timing controller 10, and the horizontal sync control signal generated by the timing controller 10 here has a cycle shorter than that of Hsync inputted to the timing controller 10. In FIG. 3, the cycle of the generated horizontal sync control signal is equal to ⅓ of the cycle of Hsync. The timing controller 10 supplies the generated horizontal sync control signal and the generated vertical sync control signal as image sync signals to the scanning line driving circuit 4 and the signal line driving circuit 6.

Since the cycle of the horizontal sync control signal is short, scanning for one frame in one vertical period is carried out in a period (scanning period) shorter than the one vertical period. The cycle of the horizontal sync control signal is not limited to the aforementioned example. For example, the cycle of the horizontal sync control signal is preferably one over an integer of the cycle of Hsync (frequency of the horizontal sync control signal is an integer-multiple of frequency of Hsync).

In accordance with the vertical sync control signal and the horizontal sync control signal inputted to the timing controller 10, the timing controller 10 supplies a video signal based on the video signal inputted thereto and recorded therein. A period for one-frame image data transfer of a video signal is equal to a scanning period.

The control signal output section 12 outputs the AMP_Enable signal in sync with the vertical sync control signal and the horizontal sync control signal thus generated.

While the AMP_Enable signal continues to have an H value, the signal line driving circuit 6 supplies a data signal to the data signal line S.

<Driving of Display Panel Section 2>

Further with reference to FIG. 3, the following description will discuss driving of the display panel section 2 controlled by the aforementioned various signals.

In the display device 1, the vertical sync control signal is supplied every one vertical period. Initially, in sync with the vertical sync control signal, the control signal output section 12 changes a voltage of the AMP_Enable signal from an L value to an H value. This changes a state of the analog amplifier 14 provided in the signal line driving circuit 6 from a non-operating state to an operating state (normal state).

Next, in sync with the vertical sync control signal and the horizontal sync control signal, the scanning line driving circuit 4 supplies a gate clock signal (selection signal) to the first scanning signal line G. This brings gates of TFTs of respective pixels connected with the scanning signal line G(1) into an on-state.

Next, in sync with the horizontal sync control signal, the signal line driving circuit 6 supplies, with respect to each data signal line S, a data signal from the analog amplifier 14 connected with the data signal line S. Consequently, voltages required for display are supplied to the data signal lines S and are written in pixel electrodes on the scanning signal line G(1) via the TFTs. After the writing, the gates of the TFTs of the pixels connected with the scanning signal line G(1) are brought back to the off-state from the on-state.

After the first one horizontal period has elapsed, a next vertical sync control signal is supplied. Then, voltages are written in pixels connected with second and subsequent scanning signal lines G, in the same manner as in the case of the pixels connected with the first scanning signal line G. A period during which the voltages are written in pixels connected with all of the N scanning signal lines G is referred to as a writing period. The writing period is equal to a scanning period.

The AMP_Enable signal continues to have an H value during the writing period.

In the first one vertical period, after the writing period (scanning period) has elapsed, the control signal output section 12 changes the voltage of the AMP_Enable signal from an H value to an L value. This brings the analog amplifier 14 into the non-operating state.

After the first one vertical period has elapsed, a next vertical sync control signal is supplied, and the same procedure as above is repeated in driving in second and subsequent frames.

While the analog amplifier 14 is in the non-operating state, the output of the analog amplifier 14 is disconnected from the data signal line S(i). As detailed later, the data signal line S(i) may be in an electrically floating state or may be connected with Vdd etc.

(Scanning Period and Non-Scanning Period)

The display device 1 has a normal mode in which the display device 1 operates with normal power consumption and a low-power-consumption mode in which the display device 1 consumes a lower power than in the normal mode.

In the normal mode, the display device 1 causes the display panel section 2 to display images of 60 frames per second. Accordingly, one frame period is approximately 16.7 ms. Since the resolution of the display device 1 is 1024×600 pixels, 600 scanning signal lines G are scanned during one frame period. In contrast, in the low-power-consumption mode, the display device 1 causes the display panel section 2 to display, for example, an image of 1 frame per second.

In driving the display panel section 2, the display device 1 divides one horizontal period into a scanning period and a non-scanning period. In the scanning period, the display device 1 causes the AMP_Enable signal to have an H value so that the analog amplifier 14 operates. Furthermore, the display device 1 causes the gate clock signal (selection signal) to be Vgh so as to bring the gates of the TFTs into an on-state. The scanning period is equal to a time period required for voltages required for display to be written in pixel electrodes. In First Embodiment, one scanning period is 16.7 (ms).

In the non-scanning period, the display device 1 causes the AMP_Enable signal to have an L value so that the analog amplifier 14 pauses. Furthermore, the display device 1 causes the gate clock signal (selection signal) to be Vgl so as to bring the gates of the TFTs into an off-state. Since the non-scanning period is a period other than the scanning period in one horizontal period, the non-scanning period in the low-power-consumption mode is 983.3 (ms).

<Destination of Connection of Data Signal Line in Non-Scanning Period>

In the non-scanning period, a destination to which the data signal line S(i) is connected may be unfixed or any power source.

For example, in the non-scanning period, the data signal line S(i) may be in an electrically floating state. In this case, in the non-scanning period (period during which the AMP_Enable signal has an L value), the analog amplifier 14 is disconnected from the data signal line S(i), and a destination to which the data signal line S(i) is connected is unfixed.

In the non-scanning period, the data signal line S(i) may be connected with a common Vdd. In this case, in the non-scanning period, the analog amplifier 14 is disconnected from the data signal line S(i), and each data signal line S(i) is connected with the common voltage source (Vdd). Consequently, a voltage supplied to the data signal line S(i) is reduced by a certain value from a peak value after the scanning period has terminated, i.e. after the AMP_Enable signal has changed from an H value to an L value. Then, thus reduced value is stably maintained. As a result, in the non-scanning period, the voltage supplied to the data signal line S is stable, so that stable display can be maintained.

In the non-scanning period, a destination to which the data signal line S(i) is connected is not limited to any voltage source (Vdd). The data signal line S(i) in the non-scanning period may be connected with a ground (GND) or a common node. In either case, it is possible to obtain an effect of stabilizing a voltage supplied to the data signal line S during the non-scanning period.

(Operation Effect)

During the non-scanning period, a steady-state current of the analog amplifier 14 is cut. As a result, the average consumed current has a value as indicated by an arrow P1 in (b) of FIG. 4, and this value is remarkably smaller than that of the average consumed current (indicated by the arrow P2 in (b) of FIG. 5) in a conventional display device.

(Description on Characterizing Part of First Embodiment)

First Embodiment has, in addition to the above configuration, a configuration in which when a user makes some operation in order to cause the display screen to display an image subsequent to an image currently displayed on the display screen, the subsequent image can be displayed on the display screen promptly.

(a) of FIG. 1 is a timing chart showing a driving mode of a conventional display panel section. (b) of FIG. 1 is a timing chart showing a driving mode of the display panel section 2 in accordance with the present embodiment (First Embodiment).

As shown in (a) of FIG. 1, the conventional display device repeatedly alternates, with a predetermined cycle, between (i) a scanning period during which image data is supplied to the plurality of pixels (voltages required for display are written in pixel electrodes) and (ii) a non-scanning period during which the image data is not supplied to the plurality of pixels (voltages required for display are not written in pixel electrodes). Consequently, every time the scanning period comes, image data held by the pixels is rewritten (updated).

In this case, as shown in (a) of FIG. 1, when a TP operation is made, in particular when a TP operation is made during the non-scanning period, there occurs a time difference (time lag) $\Delta T$ between timing of the TP operation (TP operation timing) and timing of switching to a scanning period after and nearest to the TP operation (scanning period indicated by an arrow X). During the time lag $\Delta T$, image data indicative of an image displayed on the display panel section 2 is kept by individual pixels, so that the image continues to be displayed on the display panel section 2.

In this case, a response of the electronic apparatus 100 to the user's operation is greatly different from what the user has intended. Consequently, the user may feel dissatisfied with the electronic apparatus 100 in terms of user-friendliness and operability. Particularly in the low power consumption mode, the non-scanning period is long and so the time lag $\Delta T$ tends to be long, so that the aforementioned problem is more noticeable.

In view of the foregoing problem, First Embodiment is arranged such that when the TP operation is made in the non-scanning period, the scanning line driving circuit 4 and the signal line driving circuit 6 advance (accelerate) timing of a scanning period after and nearest to detection of the TP operation (subsequent scanning period indicated by an arrow X) in such a manner that the timing comes earlier than timing predetermined for a case where the TP operation is not made. This process is hereinafter referred to as acceleration of the nearest scanning period. (b) of FIG. 1 shows a mode where the nearest scanning period comes immediately after the TP operation, and this mode is the most preferable.

In First Embodiment, a cycle of a scanning period after acceleration of the nearest scanning period is the same as a cycle T before detection of the TP operation, as in the conventional example.

As described above, by accelerating the nearest scanning period, it is possible to eliminate or shorten the time lag $\Delta T$. Accordingly, even when a user makes the TP operation in the non-scanning period in order to, for example, cause the display screen to display an image subsequent to a currently displayed image, it is possible to promptly respond to the TP operation, i.e. it is possible to cause the display panel section 2 to promptly display the subsequent image.

Consequently, it is possible to prevent or reduce a user's feel of dissatisfaction with the electronic apparatus 100 in terms of usability (user-friendliness and operability), that is, a user's feel of dissatisfaction in that a response of the electronic apparatus 100 to the TP operation is too slow as compared to a response that the user has intended and consequent timing at which an image displayed on the display panel section 2 is changed in response to the TP operation is too late.

In the First Embodiment, the TP detection behavior control signal is supplied in such a manner that the timing controller 10 directly supplies the TP detection behavior control signal to the detection control section 22 of the detection device 20. This TP detection behavior control signal is for controlling the detection process of detecting whether the TP operation is made or not. However, the present invention is not limited to this configuration. FIG. 6 is a view showing another example of a whole configuration of the electronic apparatus of the present invention.

As shown in FIG. 6, the total control section 30 includes a TP detection behavior control signal relay section 34, in addition to the detection data reception section 31, the clock/sync signal output section 32, and the video signal output section 33. The TP detection behavior control signal relay section 34 relays a TP detection behavior control signal between the timing controller 10 and the detection control section 22 of the detection device 20.

In FIG. 6, the TP detection behavior control signal supplied from the timing controller 10 to the total control section 30 is distinguished from the TP detection behavior control signal supplied from the total control section 30 to the detection control section 22 by referring to the former signal as "TP detection behavior control signal 1" and the latter signal as "TP detection behavior control signal 2".

As described above, also in the configuration in which the TP detection behavior control signal is indirectly supplied from the timing controller 10 to the detection control section 22, it is possible to yield an effect similar to the effect of the embodiment in which the TP detection behavior control signal is directly supplied to the detection control section 22 of the detection device 20.

Second Embodiment

In the First Embodiment, a cycle of a scanning period after acceleration of the nearest scanning period is the same as (is not changed from) a cycle T of a scanning period before the TP operation. However, in consideration of a case where an application for displaying a moving image is designated after the TP operation, it is preferable that the cycle of the scanning period after acceleration of the nearest scanning period be changed from (made shorter than) the cycle T of the scanning period before the TP operation. The following description will discuss in this regard.

FIG. 7 is a timing chart showing a driving mode of the display panel section 2 in accordance with Second Embodiment.

As shown in FIG. 7, an electronic apparatus 100 in accordance with Second Embodiment is designed such that when the TP operation is made, a length of a non-scanning period subsequent to the TP operation is made shorter so that the cycle of the scanning period after acceleration of the nearest scanning period is shorter than the cycle of the scanning period before the TP operation (before acceleration of the nearest scanning period).

Consequently, in response to the TP operation, a cycle of switching image data to be written in (held by) pixels of the display panel section 2 can be shorter than that before the TP operation.

As a result, for example, in a case where a certain TP operation is followed by another TP operation for designating an application for displaying a moving image, images can be updated with a shorter cycle, so that the moving image can be displayed smoothly.

Third Embodiment

In a case where a cycle of a scanning period is changed in Second Embodiment, a cycle to which a current cycle is to be changed may be obtained by either the display device 1 or the total control section 30.

(a) of FIG. 8 shows a configuration in which the display device 1 obtains the cycle to which the current cycle is to be changed.

As shown in (a) of FIG. 8, the display device 1 is electrically connected with the total control section 30 via a cable 50 so that the display device 1 is communicable with the total control section 30 via the cable 50.

The total control section 30 receives information on whether the detection device 20 detects the TP operation or not. When the total control section 30 receives the information on whether the detection device 20 detects the TP operation or not, the total control section 30 transmits the information to the display device 1. The control signal output section 12 of the display device 1 has a function of a cycle deriving section 12a for obtaining the cycle of the scanning period in accordance with the information received from the total control section 30.

The cycle deriving section 12a stores in advance cycles of scanning periods which cycles each are preset according to whether a scanning period is before a TP operation or after a TP operation. That is, the cycle deriving section 12a stores in advance a cycle (hereinafter "cycle before TP operation") Ta before the time at which a TP operation is made and a cycle (hereinafter "cycle after TP operation") Tb after the time at which a TP operation is made. The cycle Tb after a TP operation is set to be shorter than the cycle Ta before a TP operation.

In a case where the present time is before the TP operation, the cycle deriving section 12a sets a cycle of a scanning period to the cycle Ta which corresponds to a scanning period before the TP operation. In a case where the present time is after the TP operation, the cycle deriving section 12a sets a cycle of a scanning period to the cycle Tb which corresponds to a scanning period after the TP operation.

Specifically, in the low-power consumption mode, the cycle deriving section 12a sets a cycle of a scanning period to the cycle Ta which corresponds to the scanning period before the TP operation. When the TP operation is made, the cycle deriving section 12a sets a cycle of a scanning period to the cycle Tb which corresponds to the scanning period after the TP operation. When a predetermined time has passed from the last TP operation, the cycle deriving section 12a sets the cycle of the scanning period back to the cycle Ta.

In accordance with the cycle of the scanning period which has been obtained by the cycle deriving section 12a, the display device 1 rewrites image data after acceleration of timing of the nearest scanning period.

(b) of FIG. 8 shows a configuration in which the total control section 30 obtains a cycle to which a current cycle is to be changed.

As shown in (b) of FIG. 8, the display device 1 is electrically connected with the total control section 30 via the cable 50, so that the display device 1 is communicable with the total control section 30 via the cable 50.

In the electronic apparatus 100 in accordance with Third Embodiment, the total control section 30 has not only a function of relaying the TP detection behavior control signal as in the electronic apparatus 100 shown in FIG. 6, but also a function of obtaining a cycle of a scanning period in accordance with the TP detection behavior control signal. In order to realize this function, the total control section 30 in accordance with Third Embodiment includes a cycle deriving section 35, in addition to the sections 31 to 34. The cycle deriving section 35 has the same function as the cycle deriving section 12a except that the cycle deriving section 35 is different from the configuration shown in (a) of FIG. 8 in that (i) a trigger for obtaining the cycle is reception of information, from the detection device 20, on whether the TP operation is detected or not and (ii) the cycle deriving section 35 informs a cycle obtained to the display device 1. Accordingly, an explanation of the cycle deriving section 35 is omitted here.

Fourth Embodiment

In First Embodiment, a scanning period and a non-scanning period are alternately repeated even after acceleration of the nearest scanning period. Whereas in Fourth Embodiment, scanning periods are successively provided without providing any non-scanning period.

(a) of FIG. 9 is a timing chart showing a driving mode of a conventional display panel section. (b) of FIG. 9 is a timing chart showing a driving mode of the display panel section 2 in accordance with Fourth Embodiment.

As indicated by an arrow A in (b) of FIG. 9, in the electronic apparatus 100 in accordance with Fourth Embodiment, the nearest scanning period is accelerated after the TP operation as in First Embodiment. Then, the scanning periods are provided successively without providing any non-scanning period. Providing the scanning periods successively means the same as setting a length of a non-scanning period to 0 (zero) in Second Embodiment.

In order to clarify the difference between the driving mode of the display panel section 2 in accordance with Fourth Embodiment and the driving mode of the display panel section 2 in accordance with First Embodiment, in the timing chart at the lower stage of (b) of FIG. 9, the driving mode of the display panel section 2 in accordance with Fourth Embodiment is indicated by a full line and the driving mode of the display panel section 2 in accordance with First Embodiment is indicated by a dotted line.

As described above, after acceleration of the nearest scanning period as in First Embodiment, it is preferable to provide the scanning periods successively without providing any non-scanning period. In this configuration, in a case where a TP operation is made in a non-scanning period and then, for example, another TP operation to designate an application for displaying a moving image is made, the moving image can be displayed smoothly.

Fifth Embodiment

Examples of a method for approximating as much as possible timing of image data update corresponding to a TP operation to timing of the TP operation include (i) accelerating the nearest scanning period as in First to Third Embodiments, and (ii) in a configuration where detection of the TP operation is carried out periodically (intermittently), detecting the TP operation as early as possible.

(a) of FIG. 10 is a timing chart showing a driving mode of the display panel section 2, (b) of FIG. 10 is a timing chart showing a TP detection behavior control signal in accordance with Fifth Embodiment, (c) of FIG. 10 is a timing chart showing a TP operation detecting behavior, and (d) of FIG. 10 is a timing chart showing a conventional TP operation detecting behavior.

As shown in (b) of FIG. 10, the timing controller 10 supplies a TP detection behavior control signal to the detection control section 22 with a cycle Tc until a TP operation is detected. In this case, as shown in (c) of FIG. 10, the detection control section 22 carries out, with the cycle Tc, a detection process of detecting whether the TP operation is made or not in sync with (a rise of) the TP detection behavior control signal.

When the TP operation is detected, as shown in (b) of FIG. 10, the timing controller 10 supplies the TP detection behavior control signal with a cycle Td shorter than the cycle Tc (Td<Tc) to the detection control section 22. Consequently, as shown in (c) of FIG. 10, the detection control section 22 carries out a detection process of detecting whether the TP operation is made or not in sync with (a rise) of the TP detection behavior control signal.

As described above, after the TP operation, by shortening the cycle of carrying out the detection process for detecting whether the TP operation is made or not (increasing the number of the detection process per unit time), it is possible to detect, as early as possible, a TP operation that may possibly be made after acceleration of the nearest scanning period.

That is, there may be a case where a TP operation is newly made subsequent to a TP operation and this newly made TP operation is detected during a non-scanning period. If the cycle for carrying out the detection process is not changed even in such a case, there occurs a time lag ΔTn between the newly made TP operation and a detection process for the newly made TP operation as shown in (d) of FIG. 10.

On the other hand, in Fifth Embodiment, the cycle for carrying out the detection process is shortened as shown in (b) of FIG. 10. Even in this case, when a TP operation W is newly made after a TP operation as described above, there is a time lag ΔTm between the newly made TP operation and the detection process for the newly made TP operation. However, this time lag ΔTm is shorter than the time lag ΔTn. Accordingly, it is possible to detect, at an earlier time, a TP operation newly made after a TP operation.

Consequently, it is possible to more promptly switch to image data in accordance with the newly made TP operation after acceleration of the nearest scanning period.

Sixth Embodiment

FIG. 11 is an explanatory view showing a modified example of the display device 1.

FIG. 11 is an explanatory view showing another configuration example of the display device 1 shown in FIG. 2 etc. In the display device 1 shown in FIG. 2 etc., the timing controller 10 supplies, to the detection control section 22 of the detection device 20, a TP detection behavior control signal whose timing is identical to that of an AMP_Enable signal.

In the display device 1 in FIG. 2 etc., upon receipt of a video signal (clock signal, sync signal, video data signal etc.), the timing controller 10 develops a delay equivalent to several clocks to several lines of scanning before outputting a sync control signal to the signal line driving circuit 6. Such a delay is caused because some time is spent for timing generation, image processing, and/or the like processing in the timing controller 10.

On the other hand, in the display device 1, as shown in FIG. 11, the scanning line driving circuit 4 may include gate driver sections 4a (two gate driver sections 4a in the example of FIG. 11) the number of which is set according to the number of the scanning signal lines G.

Furthermore, in the display device 1, as shown in FIG. 11, the signal line driving circuit 6 may include source driver sections 6a (signal line driving section, detection instructing means, three source driver sections 6a in the example of FIG. 11) the number of which is set according to the number of the data signal lines S.

These source driver sections 6a do not develop the aforementioned delay and therefore recognize the scanning period (and driving period) and the non-scanning period (and pause period) more exactly than the timing controller 10.

Accordingly, as shown in FIG. 11, one of the source driver sections 6a may supply a TP detection behavior control signal to the detection control section 22 of the detection device 20 via a connection terminal 80. This allows eliminating the influence of the delay caused when the timing controller 10 supplies a TP detection behavior control signal to the detection control section 22. This allows more correctly informing the detection device 20 of a length of a non-scanning period of the display device 1. Consequently, it is possible to more precisely control detection behaviors to be performed by the detection section 21 of the detection device 20.

Here, in the aforementioned embodiments, a start time and an end time of the touch panel detection period may be in a period during which a detection instruction signal is active.

Seventh Embodiment

In the display device 1 in accordance with the aforementioned embodiments, displaying the same image on the same position for a long time would result in burn-in of the image on the screen. In order to avoid this, it is desirable that pixel electrodes provided in the display panel section 2 invert the polarity of a voltage once in a predetermined number of frame periods (e.g. once in one frame period). An inversion method in which voltages with the same polarity are applied on all the pixel electrodes in the display panel section 2 in one frame, voltages with the opposite polarity are applied on all the pixel electrodes in a next frame, and these processes are repeated subsequently is called "frame inversion". The frame inversion can be realized by inverting the polarities of voltages to be applied on all the data signal lines S in one frame on a per-frame-period basis.

Furthermore, in order to prevent the occurrence of flickers, it is desirable that the polarity of a voltage is inverted with respect to each of pixel electrodes arranged in at least one of a direction along which the scanning signal lines G extend and a direction along which the data signal lines S extend. Examples of such inversion include "source inversion", "line inversion", and "dot inversion". These inversions are detailed below with reference to FIGS. 12 to 15.

FIGS. 12 to 15 are structural views showing structures of the scanning signal lines G, the data signal lines S, and the pixel electrodes in the display panel section 2. In each of FIGS. 12 to 15, (a) shows the polarities of voltages to be applied to individual pixel electrodes in one frame (n-th frame), and (b) shows the polarities of voltages to be applied to individual pixel electrodes to which voltages of opposite polarities are applied in the next frame (n+1-th frame). The polarities of voltages to be applied to individual pixel electrodes are indicated by '+' (positive) and '−' (negative) in the drawings.

FIG. 12 shows an example of source inversion. The source inversion is made by inverting the polarity of a voltage to be applied with respect to each data signal line (source line) S. This allows inverting the polarity of a voltage with respect to each line of pixel electrodes arranged in the direction along which the scanning signal line G extends, as shown in FIG. 12.

FIG. 13 shows source inversion performed similarly with the case of FIG. 12, but is different from the case of FIG. 12 in terms of the configuration of pixel electrodes. In FIG. 12, the pixel electrodes connected with the data signal line S are positioned on one side (right side in FIG. 12) of the data signal line S, whereas in FIG. 13, pixel electrodes connected with the data signal line S are positioned in a zigzag manner with respect to the data signal line S. Consequently, in the FIG. 12 configuration, the polarities of voltages applied to pixel electrodes positioned between two adjacent data signal lines S are the same as each other, whereas in the FIG. 13 configuration, the polarities of voltages applied to pixel electrodes positioned between two adjacent data signal lines S change alternately.

FIG. 14 shows an example of line inversion. The line inversion is made by inverting the polarity of a voltage to be applied to the data signal line S with respect to each scanning signal line G being driven (once in each horizontal scanning period). This allows inverting the polarity of a voltage with respect to each of pixel electrodes arranged in the direction along which the data signal line S extends, as shown in FIG. 14.

FIG. 15 shows an example of dot inversion. The dot inversion can be realized by combining the source inversion shown in FIG. 12 with the line inversion shown in FIG. 14. Specifically, in driving the first scanning signal line G1, the polarities of voltages to be applied to the data signal lines S are set in such a manner that the polarity of a voltage to be applied to the first data signal line is positive (+), and the polarities of voltages to be applied to subsequent data signal lines are inverted alternately. Next, in driving the second scanning signal line G2, the polarities of voltages to be applied to the data signal lines S are set in such a manner that the polarity of a voltage to be applied to the first data signal line is negative (−) and the polarities of voltages to be applied to subsequent data signal lines are inverted alternately. In driving the third and subsequent scanning signal lines G, the inversion is repeated similarly, so that the polarities of voltages to be applied to pixel electrodes which are adjacent to each other in the direction along which the scanning signal line G extends and in the direction along which the data signal line S extends can be different from each other.

In the dot inversion driving, a consumed current is large particularly in the scanning period. Accordingly, particularly in a case of the dot inversion driving, it is preferable to employ a configuration in which when a detection target is detected, timing of a scanning period after and nearest to the detection is advanced so as to come earlier than timing of the scanning period predetermined for a case where the detection target is not detected. This configuration allows yielding a notable effect of shortening a time lag between timing of the user's operation and timing of image data rewriting (timing of image update) corresponding to the user's operation, while reducing power consumption.

(TFT)

In the display panel section (display element) 2 in accordance with the aforementioned embodiments, it is preferable to employ, as TFTs of the display panel section 2, TFTs each including a semiconductor layer made of so-called oxide semiconductor. An example of the oxide semiconductor is IGZO® (InGaZnOx). This configuration allows high-speed writing of image data into pixels.

The reason is described below with reference to FIG. 16. FIG. 16 is a view showing characteristics of several kinds of TFTs. FIG. 16 shows characteristics of a TFT using oxide semiconductor, a TFT using a-Si (amorphous silicon), and a TFT using LTPS (Low Temperature Poly Silicon). In this drawing, a lateral axis (Vgh) indicates a voltage value of an on-voltage supplied to a gate of the TFT, and a vertical axis (Id) indicates an amount of a current flowing between a source and a drain of the TFT. In particular, the period labeled as "TFT-on" in the drawing indicates a period during which the TFT is in an on-state in response to a voltage value of an on-voltage, and the period labeled as "TFT-off" in the drawing indicates a period during which the TFT is in an off-state in response to a voltage value of the on-voltage.

As shown in FIG. 16, the TFT using oxide semiconductor passes a larger amount of current (i.e. electron mobility) in an on-state than the TFT using a-Si. Specifically, although not shown in the drawing, the TFT using a-Si passes an Id current of 1 uA when the TFT is in an on-state, whereas the TFT including oxide semiconductor passes an Id current of approximately 20 to 50 uA when the TFT is in an on-state. This shows that the TFT using oxide semiconductor has electron mobility of approximately 20 to 50 times higher than that of the TFT using a-Si and also has extremely excellent on-state characteristics.

In view of the above, employing the TFT using oxide semiconductor in pixels of the display panel section 2 in accordance with the aforementioned embodiments allows the pixels to have very excellent on-state characteristics of TFTs. This increases electron mobility in writing pixel data into the pixels, thereby further shortening a time required for the writing of the pixel data.

Therefore, the display device 1 in accordance with the aforementioned embodiments allows the display panel section 2 to rewrite, at a high speed, image data in response to detection of, for example, a user's predetermined operation. Accordingly, the display device 1 can not only eliminate or shorten, as far as possible, a time lag between timing of the detection and timing of the rewriting (timing of image update) but also rewrite, at a high speed, image data as above. Therefore, it is possible to shorten a time period, for example, from detection of the user's operation to completion of update of an image. This yields an excellent effect of preventing a response of the display device from greatly differing from what the user has intended, thereby preventing or reducing a user's feel of dissatisfaction with the display device in terms of user-friendliness and operability.

(Additional Matters)

The present invention is not limited to the description of the embodiments above, but may be altered by a skilled person within the scope of the claims. An embodiment based on a proper combination of technical means disclosed in different embodiments is encompassed in the technical scope of the present invention.

(1) In the aforementioned embodiments, the nearest scanning period is accelerated with user's touch on or approach to the touch panel as a trigger. The trigger is not limited to the user's touch on or approach to the touch panel, but includes, for example, an operation on a button or a switch of the electronic apparatus 100 and an operation of shaking the electronic apparatus 100 as user's operation.

(2) The aforementioned embodiments deal with a process in a case where a TP operation is made during a non-scanning period. However, when the TP operation is made in a scanning period, a scanning period nearest to the scanning period where the TP operation is made may be provided right after the scanning period including timing of the TP operation, or may be provided right after the timing of the TP operation.

(3) In the non-scanning period, turning off at least one of all the analog amplifiers 14 in the signal line driving circuit 6 allows reducing power consumption. It is desirable to turn off all the analog amplifiers 14 because it reduces the power consumption to the largest extent.

(4) What is turned off during the non-scanning period is not limited to the analog amplifiers 14. Other than the analog amplifiers 14, a performance of a certain circuit group (element group) through which a constant current flows and which includes the analog amplifiers 14, may be reduced. Examples of such a circuit group include a DAC (Digital-Analogue-Converter) circuit section which determines a voltage for each tone and a Vdd generation circuit section.

(5) The display device 1 can reduce power consumption by reducing the performance (driving performance) of the analog amplifier 14 during the non-scanning period as described above. However, power consumption can be most effectively reduced when the analog amplifier 14 is completely turned off. Accordingly, the display device 1 can yield the effect of the present invention by "turning off the analog amplifier 14" instead of "reducing the driving performance of the analog amplifier 14". The state where the performance of the analog amplifier 14 is set the lowest is equivalent to the state where the analog amplifier 14 is turned off.

(Additional Matters 2)

The display device of the present invention is a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, when a detection target is detected by a detection device for detecting a detection target, the scanning periods being arranged such that timing of one of the scanning periods which one scanning period is after and nearest to detection of the detection target is advanced so as to come earlier than timing predetermined for a case where the detection target is not detected, the detection target being at least one of (i) a user's predetermined operation to the electronic apparatus and (ii) a radio wave coming to the electronic apparatus from outside.

The display device of the present invention may be arranged such that when the detection target is detected by the detection device, the timing of said one scanning period after and nearest to the detection of the detection target is advanced so as to come immediately after the detection.

With the arrangement, when the detection target is detected, the timing of said one scanning period after and nearest to the detection of the detection target is advanced so as to come immediately after the detection. This allows eliminating a time lag between timing of detecting the detection target and timing of image data rewriting (timing of image update) corresponding to the detection.

This makes it possible to prevent a response of the display device to the user's predetermined operation from greatly differing from what the user has intended, thereby preventing or reducing a user's feel of dissatisfaction with the display device in terms of user-friendliness and operability.

The display device of the present invention may be arranged such that at least one of the non-scanning periods which one non-scanning period is subsequent to advancement of the timing of said one scanning period after and nearest to the detection is arranged to be shorter than one of the non-scanning periods which one non-scanning period is prior to advancement of the timing of said one scanning period after and nearest to the detection, so that a cycle of one of the scanning periods which one scanning period is subsequent to advancement of the timing of said one scanning period after and nearest to the detection is set shorter than a cycle of one of the scanning periods which one scanning period is prior to advancement of the timing of said one scanning period after and nearest to the detection.

With the arrangement, when, for example, display of a moving image is instructed after the timing of said one scanning period after and nearest to the detection is advanced, image data held by the pixels is rewritten with a shorter cycle. As a result, the moving image can be displayed smoothly.

The display device of the present invention may be arranged such that after advancement of the timing of said one scanning period after and nearest to the detection, the scanning period is successively provided without providing any non-scanning period.

With the arrangement, after the timing of said one scanning period after and nearest to the detection is advanced, the scanning period is successively provided without providing any of the non-scanning periods. Consequently, when, for example, display of a moving image is instructed after the timing of said one scanning period after and nearest to the detection is advanced, image data held by the pixels is rewritten successively. Therefore, the moving image can be displayed smoothly.

The display device of the present invention may be arranged such that a polarity of a voltage applied to a display element including the plurality of pixels is inverted with a predetermined cycle in one frame.

Particularly in a case of dot inversion driving, a large amount of current is consumed during the scanning period. In order to deal with this, particularly in the case of dot inversion driving, the display device employs a configuration in which when the detection target is detected, timing of one of the scanning periods which is after and nearest to the detection is advanced. This allows remarkably shortening the time lag while reducing power consumption.

The display device of the present invention may be arranged such that the detection device includes a touch panel on a display screen of the display device, the user's predetermined operation is a touch on the touch panel or an approach to the touch panel, and the detection device detects the touch or the approach.

The touch panel is influenced by noise caused by scanning of the display device. Accordingly, in a case of using, in particular, a touch panel as the detection device, the display device employs a configuration in which when the detection target is detected, one of the scanning periods which is after and nearest to the detection is advanced as described above. This allows detecting the detection target particularly in the non-scanning period with high detection accuracy.

The display device of the present invention may be arranged such that the detection device is a radio frequency circuit for detecting the radio wave coming from outside.

In the arrangement, the radio frequency circuit is influenced by EMI radiated from the display device. Therefore, making a detection behavior in the non-scanning period allows obtaining better detection data.

The display device of the present invention may be arranged such that the plurality of pixels are provided in such a manner as to respectively correspond to intersections between a plurality of scanning signal lines extending in one direction and a plurality of data signal lines extending in other direction, the display device further comprises: a scanning line driving circuit which sequentially applies, on the plurality of scanning signal lines, a selection signal which is a signal for switching the scanning signal line to a selected state; a signal line driving circuit which writes image data in each of the plurality of data signal lines; and a timing controller which outputs the selection signal to the scanning line driving circuit in accordance with a vertical sync signal supplied from outside and outputs, to the signal line driving circuit, a writing instruction signal for instructing the signal line driving circuit to write the image data, in accordance with a horizontal sync signal supplied from outside, the signal line driving circuit includes signal line driving sections, the number of which is set according to the number of the plurality of data signal lines, and one of the signal line driving sections outputs, to the detection device, in one of the non-scanning periods, a detection instruction signal for instructing the detection device to detect the detection target.

With the arrangement, the detection device can carry out the detection in the non-scanning period.

Consequently, it is possible to provide a display device which is capable of (i) carrying out detection at a frequency higher than a refresh frequency of the display device and (ii) greatly improving detection accuracy.

The display device of the present invention may be arranged such that when the detection target is detected by the detection device, a cycle of a detection behavior of the detection device is shortened as compared to a cycle of a detection behavior of the detection device prior to the detection of the detection target.

Examples of the method for approximating as much as possible timing of image data update corresponding to the detection to timing of the detection include (i) accelerating the nearest scanning period, and (ii) in a configuration where a process of detecting the detection target is carried out periodically (intermittently), detecting the detection target as early as possible.

Accordingly, with an arrangement in which when the detection target is detected, a cycle of the detection behavior is shortened as compared to a cycle of a detection behavior prior to the detection of the detection target, it is possible to detect, as early as possible, a detection target which may possibly follow the aforementioned detection target.

This makes it possible to prevent a response of a display device to the user's predetermined operation from greatly differing from what the user has intended at the time when the user's predetermined operation is made to the display device after acceleration of the nearest scanning period. This consequently can prevent or reduce a user's feel of dissatisfaction with the display device in terms of user-friendliness and operability.

The display device may be a liquid crystal display device.

This can provide a liquid crystal display device which yields the effects of the aforementioned inventions.

The display device may be an organic electroluminescence display device.

This can provide an organic electroluminescence liquid crystal display device which yields the effects of the aforementioned inventions.

The electronic apparatus of the present invention includes: one of the aforementioned display devices; and the detection device.

The electronic apparatus of the present invention may be arranged so as to further include a control section for totally controlling the electronic apparatus, the control section being communicably connected with the display device, the control section transmitting, to the display device, information on whether the detection device detects the detection target or not, and after advancement of the timing of said one scanning period after and nearest to the detection, the display device rewriting image data with a cycle of the scanning period which cycle is in accordance with the information transmitted from the control section.

INDUSTRIAL APPLICABILITY

The present invention is widely applicable to an electronic apparatus including: (i) any of display devices such as a liquid crystal display device, an organic EL display device, and an electronic paper; and (ii) an input device such as a touch panel.

REFERENCE SIGNS LIST

1 Display device
2 Display panel section (display element)
4 Scanning line driving circuit
6 Signal line driving circuit
6a Source driver section (signal line driving section)
10 Timing controller
20 Detection device
30 Total control section (control section)
100 Electronic apparatus
G Scanning signal line
S Data signal line

The invention claimed is:

1. A display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten, the display device being provided in an electronic apparatus, when a detection target is detected by a detection device configured or programmed to detect the detection target, the scanning periods are provided such that timing of one of the scanning periods which one scanning period is after and nearest to detection of the detection target is advanced so as to come earlier than timing predetermined for a case where the detection target is not detected, the detection target corresponding to a user's predetermined operation of the electronic apparatus, the plurality of pixels being provided in such a manner as to respectively correspond to intersections between a plurality of scanning signal lines extending in one direction and a plurality of data signal lines extending in other direction, the display device further including: a scanning line driving circuit which is configured or programmed to sequentially apply on the plurality of scanning signal lines, a selection signal which is a signal for switching the scanning signal line to a selected state;

a signal line driving circuit which is configured or programmed to write image data in each of the plurality of data signal lines; and a timing controller which is configured or programmed to output the selection signal to the scanning line driving circuit in accordance with a vertical sync signal supplied from outside and output, to the signal line driving circuit, a writing instruction signal for instructing the signal line driving circuit to write the image data, in accordance with a horizontal sync signal supplied from outside, the signal line driving circuit including signal line driving sections, a number of which is set according to the number of the plurality of data signal lines, one of the signal line driving sections is configured or programmed to output to the detection device, a detection instruction signal for instructing the detection device to detect the detection target, the detection instruction signal being outputted in the non-scanning period, the detection device includes a touch panel on a display screen of the display device and the user's predetermined operation is a touching of the touch panel or an approach to the touch panel, and the detection device is configured or programmed to detect the touching or the approach.

2. The display device as set forth in claim 1, wherein when the detection target is detected by the detection device, the timing of said one scanning period after and nearest to the detection of the detection target is advanced so as to come immediately after the detection.

3. The display device as set forth in claim 1, wherein at least one of the non-scanning periods which one non-scanning period is subsequent to advancement of the timing of said one scanning period after and nearest to the detection is arranged to be shorter than one of the non-scanning periods which one non-scanning period is prior to advancement of the timing of said one scanning period after and nearest to the detection, so that a cycle of one of the scanning periods which one scanning period is subsequent to advancement of the timing of said one scanning period after and nearest to the detection is set shorter than a cycle of one of the scanning periods which one scanning period is prior to advancement of the timing of said one scanning period after and nearest to the detection.

4. The display device as set forth in claim 3, wherein after advancement of the timing of said one scanning period after and nearest to the detection, the scanning period is successively provided without providing any non-scanning period.

5. The display device as set forth in claim 1, wherein a polarity of a voltage applied to a display element including the plurality of pixels is inverted with a predetermined cycle in one frame.

6. The display device as set forth in claim 5, wherein the inversion of the polarity of the voltage is dot inversion.

7. The display device as set forth in claim 1, wherein when the detection target is detected by the detection device, a cycle of a detection behavior of the detection device is shortened as compared to a cycle of a detection behavior of the detection device prior to the detection of the detection target.

8. The display device as set forth in claim 1, wherein the plurality of pixels constituting a display element each include a TFT, and the TFT includes a semiconductor layer made of an oxide semiconductor.

9. The display device as set forth in claim 8, wherein the oxide semiconductor is In—Ga—Zn—O.

10. The display device as set forth in claim 1, wherein the display device is a liquid crystal display device.

11. The display device as set forth in claim 1, wherein the display device is an organic electroluminescence display device.

12. An electronic apparatus, comprising:
a display device as set forth in claim 1.

13. The electronic apparatus as set forth in claim 12, further comprising a controller configured or programmed to totally control the electronic apparatus,
the controller being communicably connected with the display device,
the controller transmitting, to the display device, information on whether the detection device detects the detection target or not, and
after advancement of the timing of said one scanning period after and nearest to the detection, the display device rewriting image data with a cycle of the scanning period which cycle is in accordance with the information transmitted from the controller.

14. An electronic apparatus, comprising:
a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten; and
a detection device configured or programmed to detect a detection target which is a user's predetermined operation of the electronic apparatus,
when the detection target is detected by the detection device, the detection device is configured or programmed to shorten a cycle of a detection behavior as compared to a cycle of a detection behavior prior to the detection of the detection target,
the plurality of pixels being provided in such a manner as to respectively correspond to intersections between a plurality of scanning signal lines extending in one direction and a plurality of data signal lines extending in other direction,
the display device further including:
a scanning line driving circuit which is configured or programmed to sequentially apply, on the plurality of scanning signal lines, a selection signal which is a signal for switching the scanning signal line to a selected state;
a signal line driving circuit which is configured or programmed to write image data in each of the plurality of data signal lines; and
a timing controller which is configured or programmed to output the selection signal to the scanning line driving circuit in accordance with a vertical sync signal supplied from outside and outputs, to the signal line driving circuit, a writing instruction signal for instructing the signal line driving circuit to write the image data, in accordance with a horizontal sync signal supplied from outside,
the signal line driving circuit including signal line driving sections, a number of which is set according to the number of the plurality of data signal lines,
one of the signal line driving sections is configured or programmed to output, to the detection device, a detection instruction signal for instructing the detection device to detect the detection target, the detection instruction signal being outputted in the non-scanning period,
the detection device includes a touch panel on a display screen of the display device and the user's predetermined operation is a touching of the touch panel or an approach to the touch panel, and
the detection device is configured or programmed to detect the touching or the approach.

15. A method for controlling a display device in which (a) scanning periods during which image data is supplied to a plurality of pixels and (b) non-scanning periods during which the image data is not supplied to the plurality of pixels are provided in such a manner that (a) a scanning period and (b) a non-scanning period are alternately repeated so that image data held by the plurality of pixels are repeatedly rewritten,
the display device being provided in an electronic apparatus,
the plurality of pixels being provided in such a manner as to respectively correspond to intersections between a plurality of scanning signal lines extending in one direction and a plurality of data signal lines extending in other direction,
the display device further including:
a scanning line driving circuit which is configured or programmed to sequentially apply, on the plurality of scanning signal lines, a selection signal which is a signal for switching the scanning signal line to a selected state;

a signal line driving circuit which is configured or programmed to write image data in each of the plurality of data signal lines; and a timing controller which is configured or programmed to output the selection signal to the scanning line driving circuit in accordance with a vertical sync signal supplied from outside and outputs, to the signal line driving circuit, a writing instruction signal for instructing the signal line driving circuit to write the image data, in accordance with a horizontal sync signal supplied from outside, the signal line driving circuit including signal line driving sections, a number of which is set according to the number of the plurality of data signal lines, and one of the signal line driving sections is configured or programmed to output, to a detection device, a detection instruction signal for instructing the detection device to detect a detection target, the detection instruction signal being outputted in the non-scanning period, the method comprising the step of:

when the detection target is detected by the detection device which is configured or programmed to detect a detection target, advancing timing of one of the scanning periods which is after and nearest to the detection of the detection target so as to come earlier than timing predetermined for a case where the detection target is not detected, the detection target being a user's predetermined operation of the electronic apparatus, wherein the detection device includes a touch panel on a display screen of the display device and the user's predetermined operation is a touching of the touch panel or an approach to the touch panel, and the detection device is configured or programmed to detect the touching or the approach.

* * * * *